United States Patent [19]

Galetti

[11] Patent Number: 5,862,319

[45] Date of Patent: *Jan. 19, 1999

[54] DYNAMIC DATA TOOL FOR TESTING RECORD PROCESSING SYSTEMS

[75] Inventor: Matthew Louis Galetti, Colorado Springs, Colo.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 667,313

[22] Filed: Jun. 21, 1996

[51] Int. Cl.$^6$ ........................................... G06F 9/455

[52] U.S. Cl. ........................ 395/183.09; 395/183.14; 395/500

[58] Field of Search ................... 395/183.09, 183.02, 395/183.14, 600, 700, 500, 183.13, 704, 705, 706, 712; 364/282.1, 267, 254.6, 283.1, 232.3, 578; 707/6, 101, 103, 104, 27.1, 27.4

[56] References Cited

U.S. PATENT DOCUMENTS

| 4,754,409 | 6/1988 | Ashford et al. | 364/513 |
|---|---|---|---|
| 4,809,219 | 2/1989 | Ashford et al. | 364/900 |
| 5,081,608 | 1/1992 | Tamura et al. | 395/600 |
| 5,301,315 | 4/1994 | Pellicano | 707/4 |
| 5,325,309 | 6/1994 | Halaviati et al. | 364/578 |
| 5,392,209 | 2/1995 | Eason et al. | 364/413.01 |
| 5,513,315 | 4/1996 | Tierney et al. | 395/183.13 |
| 5,522,066 | 5/1996 | Lu | 395/600 |
| 5,574,893 | 11/1996 | Southgate et al. | 395/500 |
| 5,615,356 | 3/1997 | King et al. | 395/500 |

Primary Examiner—Dieu-Minh Le

[57] ABSTRACT

A system and method for generating simulated records and transmitting the simulated records to a record processing system to emulate a real-time production environment for testing the record processing system. The present invention comprises a dynamic data tool that inputs a data structure specification file, a test data file, and an optional default data file. The data structure specification file contains the record structures of the simulated records. The test data file contains actual values for the simulated records and calling patterns. The calling patterns specify to the dynamic data tool the number and frequency with which to transmit the simulated records to the record processing system. The optional default data file contains default values for the simulated records.

15 Claims, 12 Drawing Sheets

DYNAMIC DATA TOOL FOR TESTING RECORD PROCESSING SYSTEMS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates to computer testing systems, and more particularly to a computer testing system that creates and transmits any type of data record to a record processing system to simulate a real-time production environment for testing the record processing system.

2. Related Art

Transaction service providers, such as telecommunications companies, use transaction records for various purposes in representing the services provided. The transaction service providers create records during or upon completion of services for billing, reporting, resource planning, fraud management, and other purposes. The transaction service provider sends these records to various record processing systems for handling.

To test a specific record processing system prior to bringing the system on-line with the transaction service provider, a testing system creates and transmits simulated records to the record processing system. This allows for the testing of the functionality and stress capabilities of the record processing system in a controlled test environment that emulates a real-time production environment.

One example is the testing of a fraud management system (FMS) for a telecommunications network. A FMS is a record processing system that receives various types of records from the network and detects fraudulent telephone calls through the use of thresholding and pattern recognition processes. The FMS reads multiple record formats and structures that the telecommunications network generates. Therefore, testing of the FMS requires a testing system that generates simulated records representing the multiple record structures that the telecommunications network generates and transmits to the FMS record processing system. Then, after generating the simulated records, the testing system transmits the simulated records to the FMS such that the transmission emulates a real-time production environment of the telecommunications network.

A problem arises whenever the structure of a record is changed in the network, or when a new record is added. The corresponding simulated record that is generated by the testing system must also change or be added. In conventional testing systems, this requires extensive programming changes to the software of the testing system in order to generate simulated records with the proper record structure.

A second problem arises when there is a change to the transport method of sending the simulated records from the network to a record processing system. The transport method is how the records are transmitted from the network to the record processing system. For example, a problem arises when the transport method changes from an X.25 protocol to a TCP/IP. Such a change requires changes to the software of the testing system because the testing system must accurately emulate the transport of the simulated records from the network to the record processing system.

SUMMARY OF THE INVENTION

The present invention provides for quick and easy changes to be made to the data structures of simulated records generated by a testing system such that the simulated records correspond precisely to the changes in the data structures of the actual records generated by a transaction service provider. Upon a change to an actual record structure, the testing system of the present invention requires no changes to or recompilations of source code.

The present invention identifies three features of a record that are dynamic in nature such that a change to any of these record features within a transaction service provider results in a change to a conventional testing system. These features are the record structures, values for data fields of the record (including both default values and actual values), and calling patterns that represent the number and frequency with which a record is sent by a transaction service provider to a record processing system.

The present invention removes these features from the source code of a testing system. More specifically, these features are not hard-coded into the testing system; that is, they are not compiled and linked into an executable image of the testing system. The present invention uses these three features as inputs to the testing system such that the testing system determines at runtime the structure, data field values, and calling patterns of each simulated record. Therefore, when one of these record features changes, the software of the testing system of the present invention does not have to be modified, recompiled, and linked. The change need only be made to an input file to the testing system. Then, when the testing system is next executed, it automatically generates and transmits the correct simulated records to emulate a real-time productive environment of the transaction service provider.

In operation, the present invention provides a testing system that is an executable program having three input files: a data structure specification files (DSSF), a test data file (TDF), and an optional default data file (DDF). The DSSF contains the specifications of the data structures for each of the simulated records.

The DDF specifies default values for data fields of the simulated records. More specifically, the DDF explicitly assigns values to the data fields of each simulated record. The data fields specified in the DDF correspond to the record structures contained in the DSSF. The DDF is valuable for providing data values for those data fields that do not change frequently. If the DDF does not specify a data field's value, the data field defaults to a null value. The DDF is an optional input file.

The TDF is a script file that specifies actual values for data fields of the simulated records. Similar to the DDF, the data fields specified in the TDF correspond to the record structures contained in the DSSF. The data values specified in the TDF override any data values specified in the DDF. Therefore, the TDF only needs to specify a limited set of data field values that are relevant to a specific test case because the DDF provides the data values for those data fields not specified in the TDF.

The TDF also uses programming syntax to execute programming functions, such as conditional statements, looping statements, and subroutine calls. Through the use of these programming functions, the TDF emulates calling patterns to transmit the simulated records to the record processing system in a realistic manner. The TDF may send each simulated record one or multiple times depending on the test case.

In addition to the DSSF, the TDF, and the DDF, the testing system of the present invention also receives as input a communications protocol that is to be used for transmitting the simulated records to the record processing system being tested. The user of the testing system selects the communications protocol at runtime from a list of available protocols provided by the testing system.

The testing system of the present invention can also receive data sent from the record processing system and store it to a file for analysis. This feature provides a complete testing environment of the record processing system.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview of a conventional testing system

Figure 1:
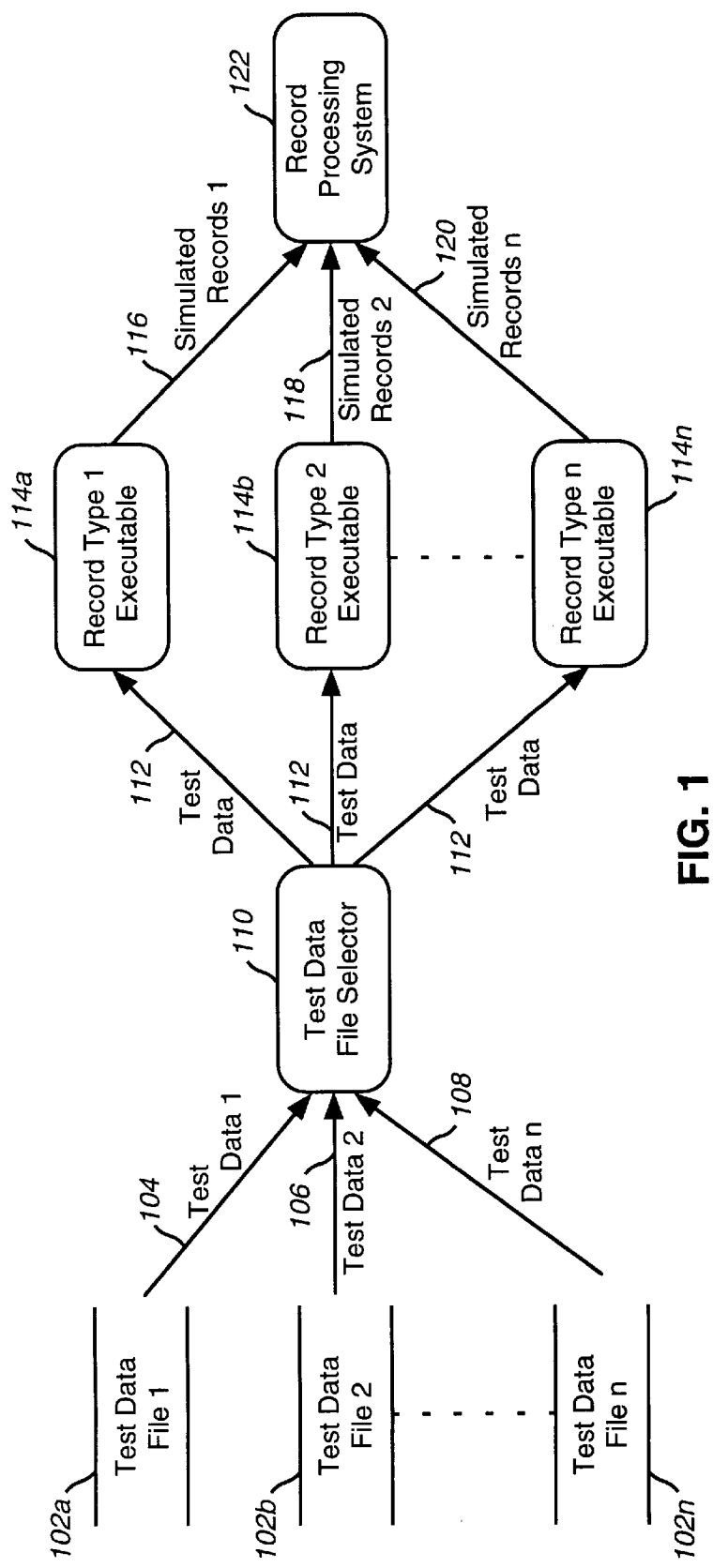
FIG. 1 is a block diagram illustrating a conventional testing system.

FIG. 1 is a block diagram illustrating a conventional testing system. In a conventional testing system, there are several test data files 102a–102n, each containing a different test case for testing a record processing system 122. A user selects a specific test data file 102a–102n via a test data file selector 110. More specifically, if a user selects test data file 1 102a, the test data file selector 110 inputs tests data 1 104. If a user selects test data file 2 102b, the test data file selector 110 inputs tests data 1 106. If a user selects test data file n 102n, the test data file selector 110 inputs tests data n 108. Therefore, the test data file selector 110 sends test data 1 104, test data 2 106, or test data n 108 to the remainder of the testing system as the test data 112.

The test data 112 is then input to each of several executable programs. There is a separate executable program for each record being simulated. For example, record type 1 executable 114a generates only simulated records of record type 1, called simulated records 1 116. Record type 2 executable 114b generates only simulated records of record type 2, called simulated records 2 118. Record type n executable 114n generates only simulated records of record type n, called simulated records n 120. Therefore, each record type executable 114a–114n uses the test data 112 and generates one or several records in accordance with the record structure that is encoded within that record type executable 114a–114n. The record type executables 114a–114n then transmit the simulated records 1 116, simulated records 2 118, and simulated records n 120 to the record processing system 122 that is being tested.

The problem with the conventional test system is illustrated when a record structure changes. In this case, the corresponding simulated record structure that is hard coded in a record type executable 114a–114n must be recoded to reflect the change. This results in a record type executable 114a–114n being recompiled and relinked prior to execution of a test case. The problem with the conventional test system is further illustrated when a new record structure must be added. In this case, a new record type executable 114a–114n must be written, compiled, and linked. Therefore, when record structures are changed or added frequently, reprogramming efforts are extensive and time-consuming. This causes time delays in testing the record processing system 122.

2. Overview of the preferred embodiment of the present invention

Figure 2:
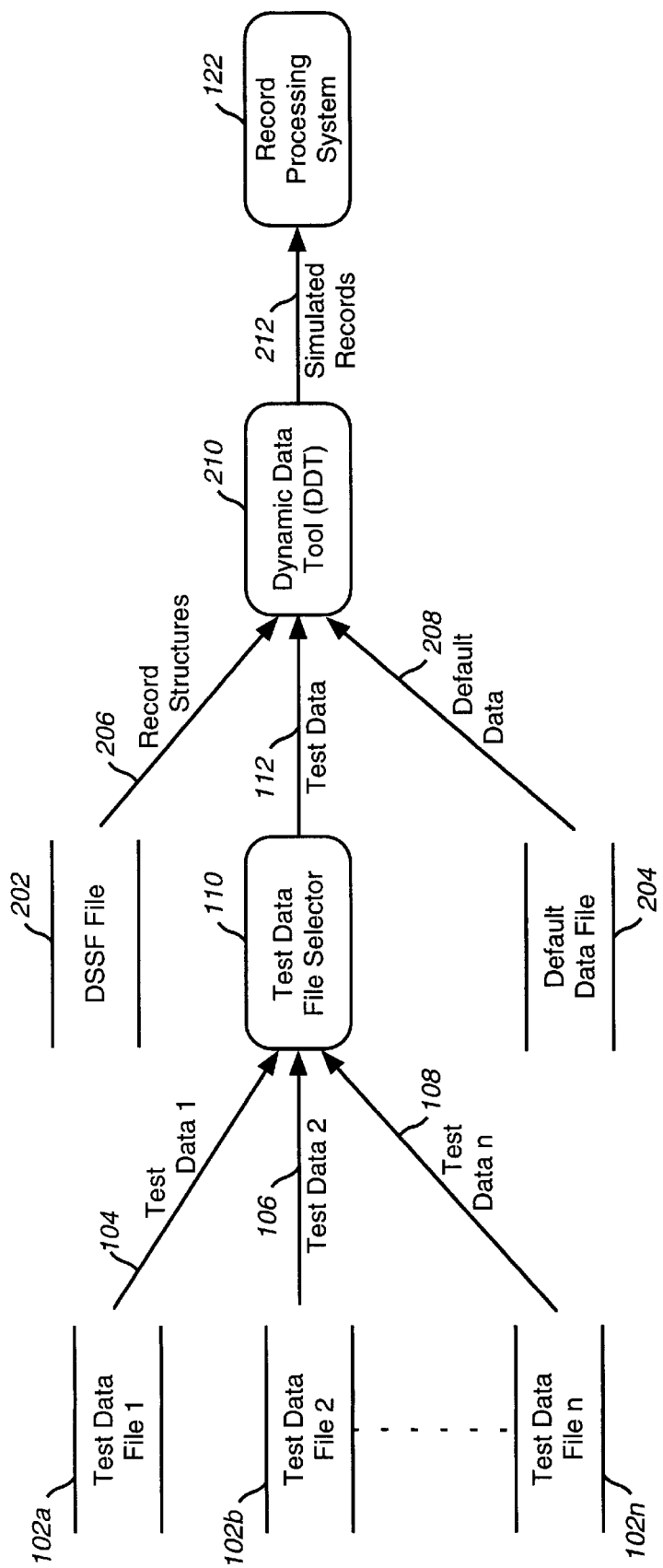
FIG. 2 is a block diagram illustrating a preferred embodiment of a dynamic data tool.

FIG. 2 is a block diagram illustrating the preferred embodiment of a dynamic data tool (DDT) 210. The DDT creates and transmits any type of simulated record to a record processing system 122, thereby testing the record processing system 122 in a real-time production environment.

Similar to the conventional testing system, the preferred embodiment of the present invention comprises one or more test data files 102a–102n. Each test data file 102a–102n is a script file that specifies actual values for data fields of the simulated records and testing patterns for transmitting the simulated records to the record processing system 122. Therefore, each test data file 102a–102n represents a specific test case. A user selects a test data file 102a–102n for execution via a test data file selector 110. If a user selects test data file 1 102a, the test data selector 110 inputs test data 1 104. If a user selects test data file 2 102b, the test data selector 110 inputs test data 2 106. If a user selects test data file n 102n, the test data selector 110 inputs test data n 108. The test data file selector 110 then sends test data 1 104, test data 2 106, or test data n 108 to the remainder of the DDT 210 as test data 112.

In addition to the test data 112, at run-time the DDT 210 also inputs record structures 206 from a DSSF 202 and default data 208 from a default data file 204. The DSSF 202 contains the specifications of the record structures for each of the simulated records.

The default data file 204 is an optional input file to the DDT 210 that specifies default values for data fields of the simulated records. More specifically, the default data file 204 explicitly assigns values to each data field of each simulated record. The data fields specified in the default data file 204 correspond to the record structures 206 contained in the DSSF 202. The default data file 204 is valuable for providing data values for those data fields that do not change frequently.

The data values specified in each test data file 102a–102n override the data values specified in the default data file 204.

Therefore, a test data file 102a–102n only needs to specify a limited set of data field values that are relevant to a specific test case because the default data file 204 provides the data values for those data fields not specified in the test data file 102a–102n.

Upon inputting the record structures 206, test data 112, and default data 208 at runtime, the DDT 210 generates and transmits simulated records 212 to the record processing system 122. Therefore, the preferred embodiment of the DDT 210 removes the dynamic features of data records from an executable image of a testing system. When a record structure 206 is to be changed, or a new record structure 206 is to be added, a user only has to update the input files (the DSSF 202, the test data files 102a–102n, and the default data file 204) to reflect the changes. The DDT 210 does not require any code changes.

Figure 3:
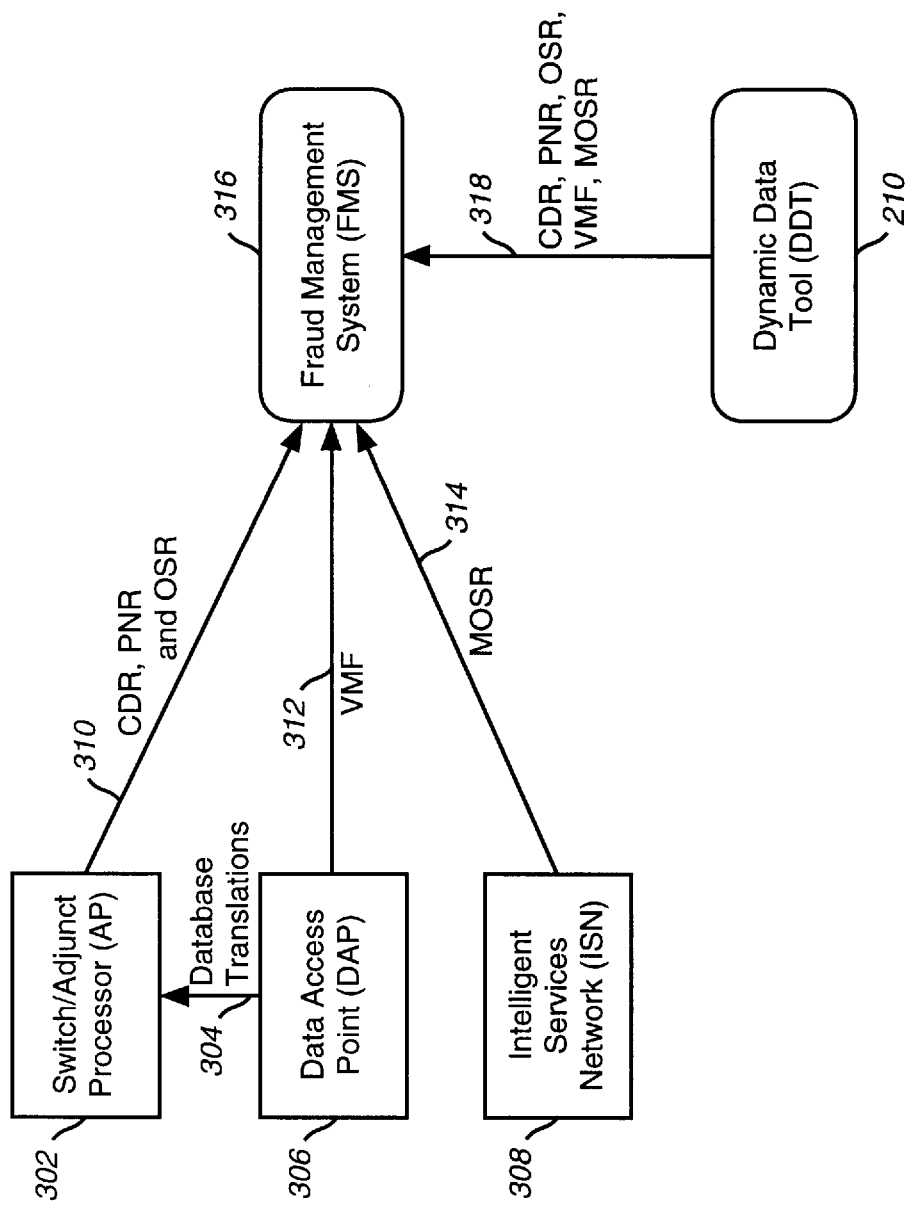
FIG. 3 is a block diagram illustrating an application of the dynamic data tool.

FIG. 3 is a block diagram illustrating an application of the DDT 210. More specifically, FIG. 3 illustrates the use of the DDT 210 within a telecommunication network. It should be understood that a description of the DDT 210 in this environment is for convenience purposes only. It would be readily apparent to apply the present invention to other comparable environments.

The sample telecommunications network comprises multiple components: switch/adjunct processor (AP) 302, data access point (DAP) 306, and intelligent services network (ISN) 308. It should be understood, however, that these components represent only a subset of a telecommunications network. It would be apparent to one skilled in the art to include other components into the network.

Each component of the network generates one or more different types of records and transmits the records to a record processing system 122. In this sample environment, the record processing system 122 is a fraud management system (FMS) 316. A FMS 316 receives various types of records from the network components and detects fraudulent calls through the use of thresholding and pattern recognition processes.

The switch/AP 302 generates three different records: call detail records (CDR), private network records (PNR), and operator service records (OSR) 310. The switch/AP 302 generates CDRs for recording information pertaining to traditional long distance calls. PNRs record information pertaining to virtual private network calls, and OSRs record information pertaining to telephone calls requiring operator assistance. The switch/AP 302 also generates enhanced versions of the CDR, PNR, and OSR to record additional information pertaining to a telephone call. Example embodiments of CDRs, PNRs, OSRs, and enhanced versions thereof, are described in U.S. patent application to W. G. Welter, titled 32/64-Word Billing Record, filed Dec. 31, 1995, unofficial Ser. No. 08/581,736, which is incorporated herein by reference in its entirety. The AP then collects all of the records from a switch and transmits them in volume batches to the FMS 316 via an X.25 communications protocol. The X.25 protocol is a well-known, standard local area network (LAN) protocol.

The DAP 306 provides a switch/AP 302 with database translations 304 for enhanced routing services. The switch/AP 302 queries the DAP 306 for routing terminations for special service calls. The DAP 306 generates validation message format (VMF) 312 records that provide information on the database translation 304 that it performed. The DAP 306 transmits the VMF 312 records to the FMS 316 via a conventional communications protocol, such as X.25, TCP/IP, or an Ethernet LAN.

The ISN 308 provides operator services and other intelligent network-based services. The ISN 308 is built with automatic call distributors, operator center LANs/wide area networks (WANs), adjunct processors (AP), and various other components. The ISN 308 generates matched/merged OSRs with billing detail records (BDR), such that a OSR and BDR are matched and merged together to form a MOSR 314. A MOSR 314 provides information on the services that the ISN 308 provided, such as operator assisted calls.

The sample application shown in FIG. 3 illustrates that a record processing system 122, such as the FMS 316, receives numerous types of records via various communications protocols from various network components. Therefore, to test new and enhanced functionality of the FMS 316, the dynamic data tool (DDT) 210 must generate simulated records representing each type of record that can be created by a network component. More specifically, in this sample environment, the DDT 210 must generate the following records: CDR, PNR, OSR, VMF, and MOSR 318. The DDT 210 must then be able to transmit the simulated records to the FMS 316 via any communications protocol that the network uses. If a network component changes or adds a record structure, the DDT 320 must generate and transmit simulated records that reflect the change or addition.

Figure 4:
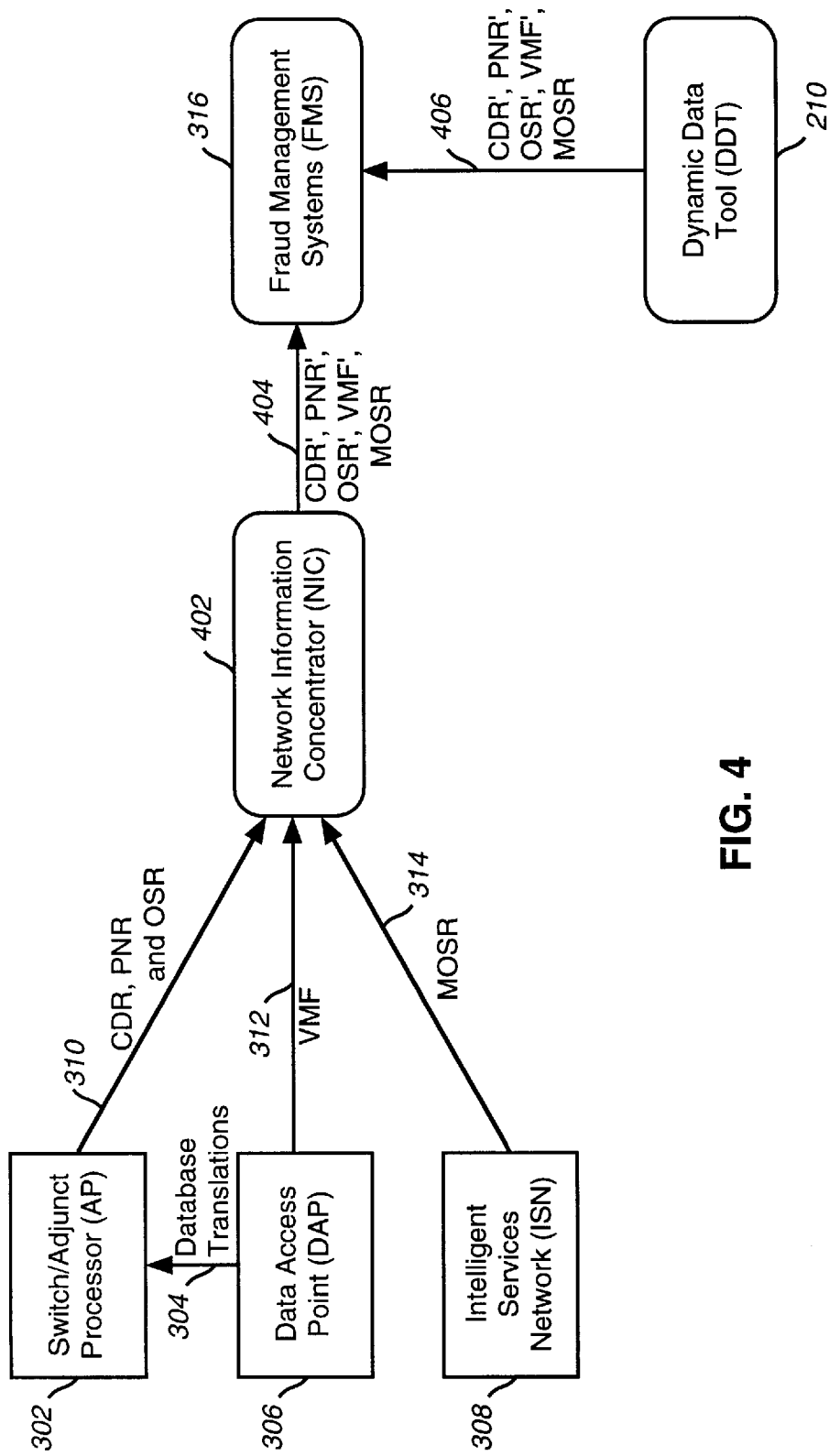
FIG. 4 is a block diagram illustrating an alternate application of the dynamic data tool.

FIG. 4 is a block diagram illustrating an alternate application of the DDT 210. The telecommunications network illustrated in FIG. 4 comprises the identical components of the telecommunications network illustrated in FIG. 3 with the addition of a network information concentrator (NIC) 402.

The NIC 402 acts like a funnel and receives all of the records from the network components providing a single transmission of the records to the FMS 316. More specifically, the NIC 402 receives the CDR, PNR, and OSR 310 from the switch/AP 302, receives the VMF 312 from the DAP 306, and receives the MOSR 314 from the ISN 308.

Upon receiving the various records from the network components, the NIC 402 slightly modifies the records before passing them to the FMS 316. That is, the NIC 402 transmits new record types, such as CDR', PNR', OSR', VMF', and MOSR' 404, to the FMS 316.

In this scenario, the DDT 210 must be modified to generate simulated records having the new record structures (CDR', PNR', OSR', VMF', and MOSR' 406) and transmit the simulated records to the FMS 316 for testing.

3. Host system of a preferred environment for the present invention

Figure 5:
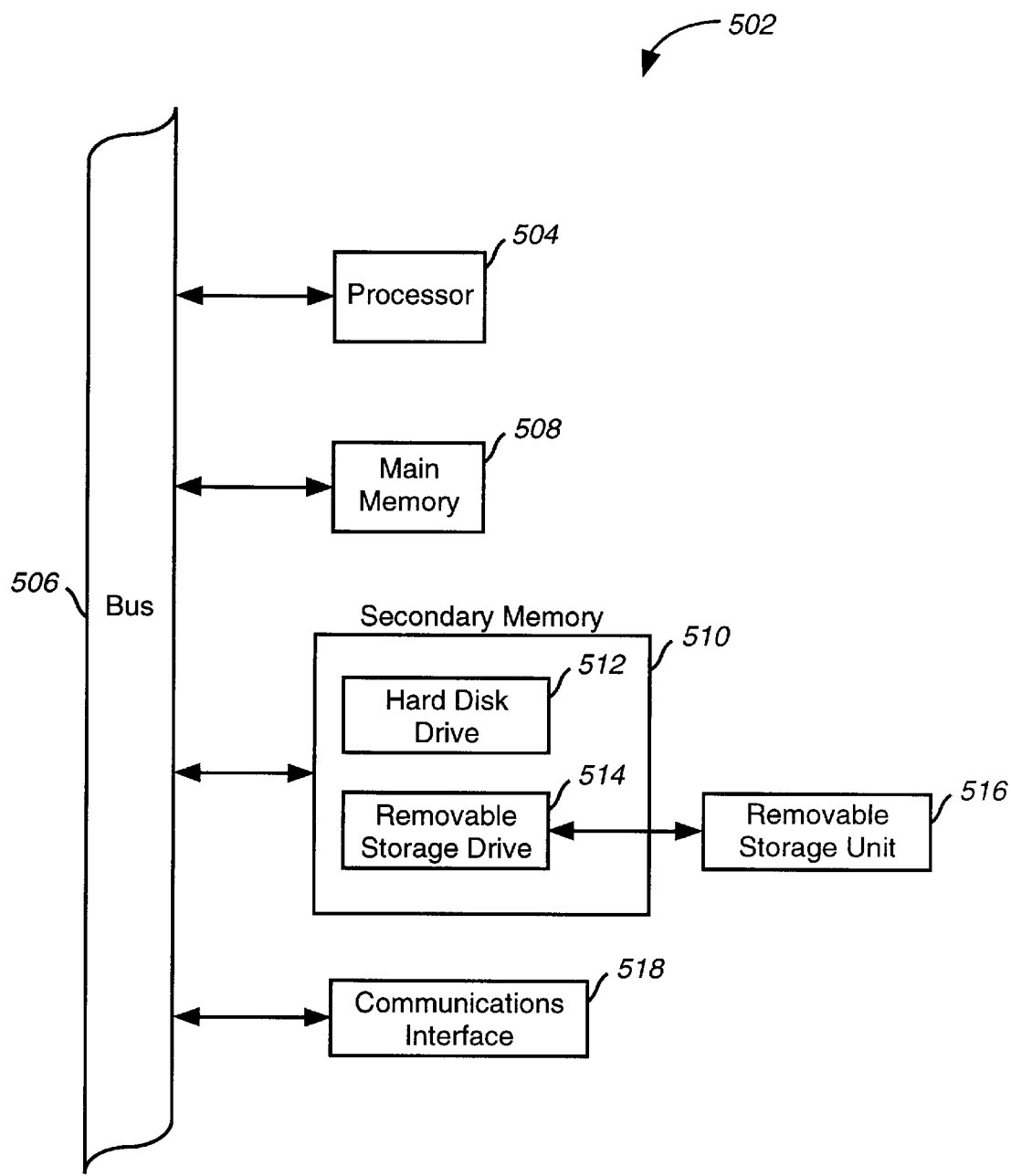
FIG. 5 is a block diagram of an exemplary computer system in which the dynamic data tool executes.

The chosen embodiment of the present invention is computer software executing within a computer system. FIG. 5 shows an exemplary computer system. The computer system 502 includes one or more processors, such as a processor 504. The processor 504 is connected to a communication bus 506.

The computer system 502 also includes a main memory 508, preferably random access memory (RAM), and a secondary memory 510. The secondary memory 510 includes, for example, a hard disk drive 512 and/or a removable storage drive 514, representing a floppy disk drive, a magnetic tape drive, a compact disk drive, a compact disk drive, a program cartridge and cartridge interface (such as that found in video game devices), a removable memory chip (such as EPROM, or PROM), etc. which is read by and written to by a removable storage unit 516. Removable storage unit 516, also called a program storage device or a computer program product, represents a floppy disk, magnetic tape, compact disk, etc. As will be appreciated, the removable storage unit 516 includes a computer usable storage medium having stored therein computer software and/or data. The removable storage drive 514 reads from and/or writes to a removable storage unit 516 in a well known manner.

The computer system 502 may also include other similar means for allowing computer programs or other instructions to be loaded. Such means can include, for example, a communications interface 518. Communications interface 518 allows software and data to be transferred between computer system 502 and external devices. Examples of communications interface 518 can include a modem, a network interface (such as an Ethernet card), a communications port, etc. Software and data transferred via communications interface 518 are in the form of signals which can be electronic, electromagnetic, optical or other signals capable of being received by communications interface 518.

In this document, the term "computer program product" is used to generally refer to removable storage unit 516, a hard disk installed in hard disk drive 512, and signals transferred via communications interface 518. These computer program products are means for providing software to a computer system 502.

In an embodiment where the invention is implemented using software, the software may be stored in main memory 508, or in a computer program product and loaded into computer system 502 using removable storage drive 514, hard disk drive 512, or communications interface 518. The software, when executed by the processor 504, causes the processor 504 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a computer system 502 using the UNIX operating system. UNIX is commercially available and is well known in the relevant art. The preferred embodiment of the present invention is implemented in software, and more specifically, is written in the programming language C. The preferred embodiment is described in these terms for convenience purpose only. Other comparable computer systems 502, operating systems, and programming languages could alternatively be used.

4. Control flow of the present invention

Figure 6:
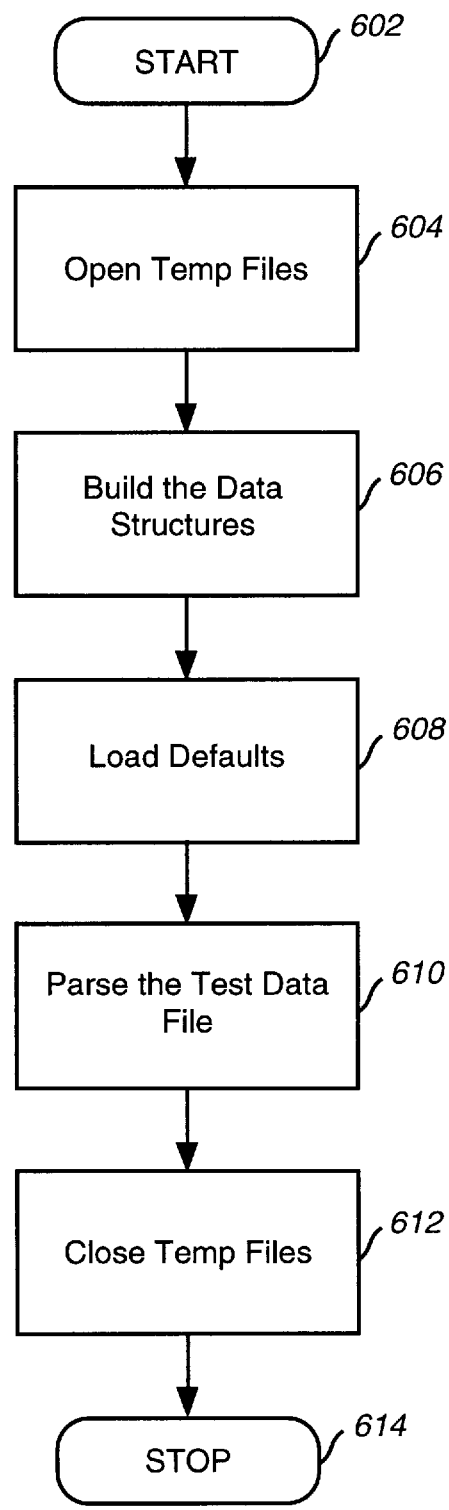
FIG. 6 is a control flow diagram illustrating the high-level operation of the dynamic data tool.

FIG. 6 is a control flow diagram illustrating the high-level operation of a preferred embodiment of a dynamic data tool (DDT) 210. Processing begins at step 602 and immediately proceeds to step 604.

In step 604, the DDT 210 opens temporary files that are needed during execution. Continuing to step 606, the DDT 210 builds the data structures. The DDT 210 reads the DSSF 202 and generates the corresponding data structures. Continuing to step 608, the DDT 210 loads the default values. The DDT 210 reads the default data file 204 and inputs the default values into the data structures generated in step 606. Continuing to step 610, the DDT 210 parses a test data file 102*a*–102*n*. The DDT 210 reads the test data file 102*a*–102*n* selected by the user, then inputs actual data values into the data structures generated in step 606. The DDT 210 then executes a testing pattern for transmitting simulated records to a record processing system 122. Continuing to step 612, the DDT 210 closes the temporary files that were opened in step 604. Continuing to step 614, the DDT 210 ends its processing and exits. Steps 604–612 are described in greater detail below.

Figure 7:
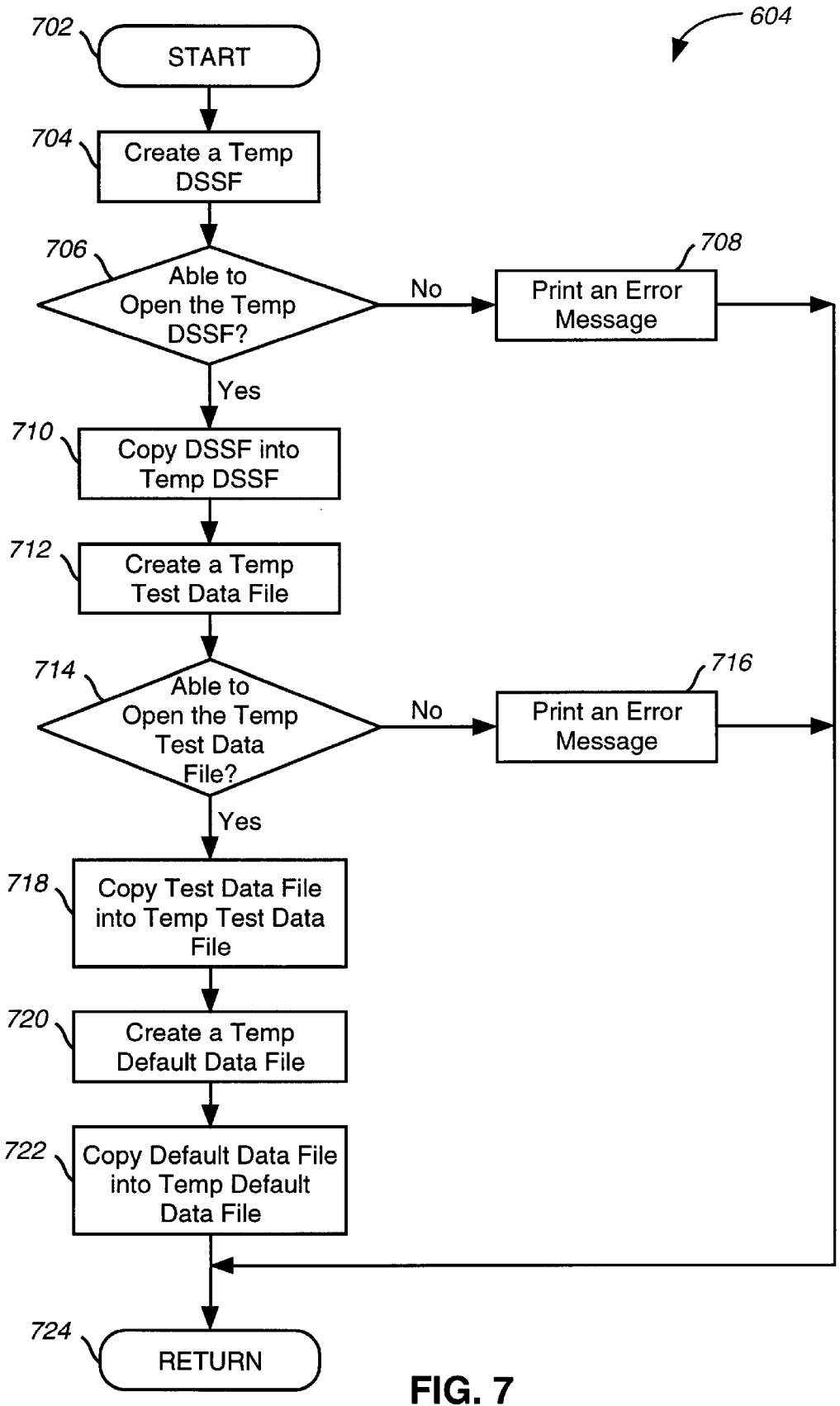
FIG. 7 is a control flow diagram illustrating the opening of temp files.

FIG. 7 is a control flow diagram illustrating step 604 and the opening of temporary files. Temporary files are opened to store a version of each input file (DSSF 202, test data file 102*a*–102*n*, and default data file 204) that has all comments stripped out and any line continuations combined into one line. Processing begins at step 702 and immediately proceeds to step 704. In step 704, the DDT 210 creates a temporary DSSF. Continuing to step 706, the DDT 210 determines whether it is able to open the temporary DSSF. If the DDT 210 determines that it cannot open the temporary DSSF, the DDT 210 proceeds to step 708. In step 708, the DDT 210 prints an error message to the user before continuing to step 724. In step 724, the DDT 210 completes its processing of step 604 and returns control to FIG. 6.

Referring again to step 706, if the DDT 210 determines that it can open the temporary rule file, the DDT 210 proceeds to step 710. In step 710, the DDT 210 copies the contents of the DSSF 202 into the temporary DSSF created in step 704. When writing the contents to the temporary DSSF, the DDT 210 strips out all comment lines and combines all line continuations into one line.

A DSSF 202 is written according to a specific syntax. The preferred embodiment of a DSSF 202 models the programming language C structure syntax. The DSSF 202 is described in these terms for convenience purpose only. It would be readily apparent to one skilled in the relevant art to generate and implement a comparable syntax for the DSSF 202.

More specifically, the DSSF 202 implements the following syntax. The "BEGIN DATA_DEFINITION" command informs the DDT 210 that the high level data structure is being defined. The "END DATA_DEFINITION" command informs the DDT 210 that the high level data structure is complete. Record structures are listed in between these two commands and the use of the "< >" symbols after a record name indicates that the record may be repeated. The following is an example of using these commands:

```
BEGIN DATA_DEFINTION
TestData< >
{
MOSRHeader
MOSRData< >
{
DataSourceRec
OSRVerRec
}
}
Registration< >
{
RegHeader
}
END DATA_DEFINITION
```

Therefore, in the above example, the DSSF 202 defines the two record: TestData and Registration. The TestData record is defined as one MOSRHeader record and multiple MOSRData records. There is also one DataSourceRec and one OSRVerRec record per MOSRData record. The Registration record contains one RegHeader record.

The DSSF 202 then specifies the data fields for each record to be simulated. Every field entry must include a field name, field type and the field length. In the preferred embodiment, these components of a field entry are comma delimited. The following are examples of defining the data fields of a record:

```
DataSourceRec
{
DataSource,char,4
}
OSRVerRec
{
DataVersion,short,2
}
RegHeader
{
CH_DataLength,short,2
CH_DataType,byte,1
CH_MessageType,byte,1
CH_HostType,char,4
CH_HeaderVersion,byte,1
CH_ControlInformation,byte,1
}
```

Therefore, in the above examples, the DataSourceRec record has one data field called DataSource that is a character four bytes in length. The OSRVerRec record has also one data field called DataVersion that is a short integer two bytes in length. The RegHeader record has six data fields that are defined accordingly.

After copying the DSSF 202 to the temporary rule file, the DDT 210 continues to step 712. In step 712, the DDT 210 creates a temporary test data file. Continuing to step 714, the DDT 210 determines whether it is able to open the temporary test data file. If the DDT 210 determines that it cannot open the temporary test data file, the DDT 210 proceeds to step 716. In step 716, the DDT 210 prints an error message to the user before continuing to step 724. In step 724, the DDT 210 completes its processing of step 604 and returns control to FIG. 6.

Referring again to step 714, if the DDT 210 determines that it can open the temporary test data file, the DDT 210 proceeds to step 718. In step 718, the DDT 210 copies the contents of the selected test data file 102*a*–102*n* into the temporary test data file created in step 712. When writing the contents to the temporary test data file, the DDT 210 strips out all comment lines and combines all line continuations into one line.

A test data file 102*a*–102*n* is written according to a specific syntax. The preferred embodiment of a test data file 102*a*–102*n* models the programming language C structure syntax. The test data file 102*a*–102*n* is described in these terms for convenience purpose only. It would be readily apparent to one skilled in the relevant art to generate and implement a comparable syntax for the test data file 102*a*14 102*n*.

A test data file 102*a*–102*n* is a script file containing commands to generate simulated records and transmit those simulated records to the record processing system 122 being tested. An example embodiment of the commands as a test data file 102*a*14 102*n* as discussed herein are further described in Table 1 below, which is self-explanatory. The embodiments of the commands of the present invention comprise complete descriptions. It would be apparent to one skilled in the relevant art to develop alternative embodiments for these command having a different syntax, as well as to develop additional commands.

After copying the test data file 102*a*14 102*n* to the temporary test data file, the DDT 210 continues to step 720. In step 720, the DDT 210 creates a temporary default data file. Continuing to step 722, the DDT 210 copies the contents of the default data file 204 into the temporary default data file created in step 720. When writing the contents to the temporary default data file, the DDT 210 strips out all comment lines and combines all line continuations into one line.

A default data file 204 is written according to a specific syntax. The preferred embodiment of a default data file 204 models the programming language C structure syntax. The default data file 204 is described in these terms for convenience purpose only. It would be readily apparent to one skilled in the relevant art to generate and implement a comparable syntax for the default data file 204.

More specifically, the default data file 204 implements the following syntax. The "BEGIN DEFAULT_DATA" command indicates the beginning of the default data, while the "END DEFAULT_DATA" command indicates the end of the default data. The following is an example of using these commands:

```
BEGIN DEFAULT_DATA
DataSourceRec.DataSource="12CD"
OSRVerRec.DataVersion=96
RegHeader.CH_DataLength=20
RegHeader.CH_HeaderVersion=4
END DEFAULT_DATA
```

Therefore, in the above example, the default data file 204 defines the DataSource field of the DataSourceRec record to have a default value of "12CD." The DataVersion data field of the OSRVerRec record has a default value of "96." In the RegHeader record, the CH_DataLength data field has a default value of "20," and the CH_HeaderVersion data field has a default value of "4."

If a data field of a record is of the type binary coded decimal (BCD), the preferred embodiment of the DDT 210 automatically converts a specified data field value to BCD. For example, field_1="1234" is converted to hexadecimal "2143." If a "." is specified in the value, the "." is replaced with a hexadecimal "F." Therefore, if field_1=".12", then the value is converted to hexadecimal "FF21." If a "" is specified in the value, the "" is replaced with a hexadecimal "0." Therefore, if field_1="12", then the value is converted to hexadecimal "0021." It would be readily apparent to one skilled in the relevant art to implement this automatic conversion for BCD data values.

After copying the default data file 204 to the temporary default data file, the DDT 210 continues to step 724 in which the DDT 210 completes its processing of step 604 and returns control to FIG. 6.

Figure 8:
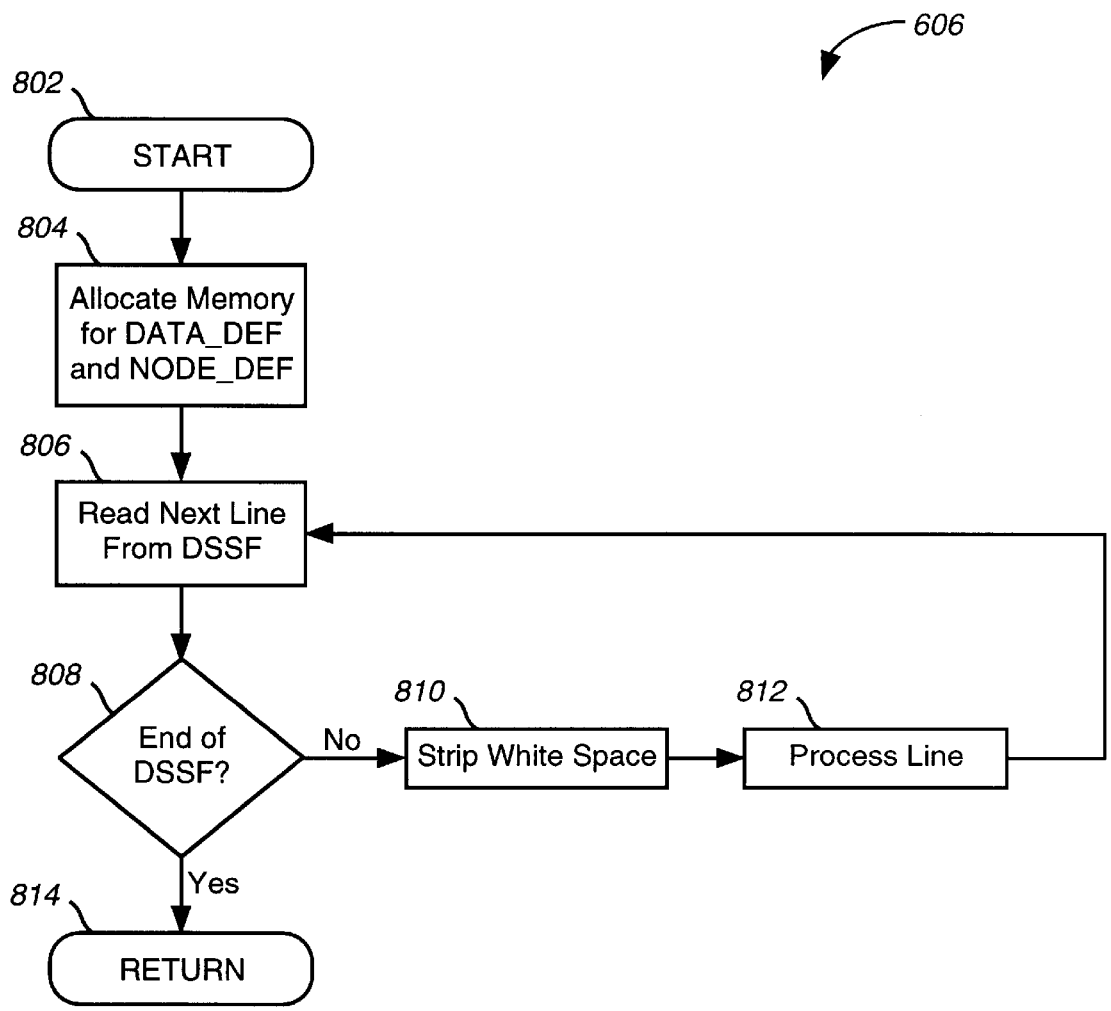
FIG. 8 is a control flow diagram illustrating the building of the data structures.

FIG. 8 is a control flow diagram illustrating step 606 and the building of the data structures in the temporary rule file created in step 604. Processing begins at step 802 and immediately proceeds to step 804. In step 804, the DDT 210 allocates memory 508 for the variables DATA_DEF and NODE_DEF.

The preferred embodiment of the variable DATA_DEF is an array containing each data structure 206 as read from the rules file 202. An example definition of DATA_DEF is as follows:

```
typedef struct {
        char    name[100];              /* field name */
        char    type;                   /* field type (i.e. char, int, etc.) */
        char    size_in_bytes;          /* size of field in bytes */
        int     bit_offset;             /* bit offset of the field in the record */
} FIELD_DEF
typedef struct {
        char    table_name[100];        /* name of the table */
        int     length_in_bits;         /* size of the table in bits */
        int     length_in_bytes;        /* size of the table in bytes */
        int     number_of_fields;       /* number of fields in the record structure */
        FIELD_DEF *fields;              /* list of fields in record strucutre */
        void    *default_data;          /* default data for each field of record */
} DATA_DEF
```

The preferred embodiment of the variable NODE_DEF is an array containing the name, type, and total size of each data definition in the DSSF 202. An example definition of NODE_DEF is as follows:

```
typedef struct {
        char    type;                   /* type of the structure */
        char    name[100];              /* name of the structure */
        int     size_in_bytes;          /* size in bytes of the structure */
} NODE_DEF;
```

It would be readily apparent to one skilled in the art to implement comparable data structures for maintaining the data structures 206. Continuing to step 806, the DDT 210 reads the next line in the temporary DSSF.

The DDT 210 then continues to step 808. In step 808, the DDT 210 determines if it has reached the end of the temporary DSSF. If the DDT 210 determines that it is at the end of the temporary DSSF, the DDT 210 proceeds to step 814. In step 814, the DDT 210 has completed step 606 and its building of the data structures. Therefore, the DDT 210 returns control back to FIG. 6.

Referring again to step 808, if the DDT 210 determines that it has not reached the end of the temporary DSSF, then the DDT 210 must process the current line that it just read and proceeds to step 810. In step 810, the DDT 210 strips the white space from the current line. Continuing to step 812, the DDT 210 processes the current line. Step 812 is described in greater detail below. After processing the current line, the DDT 210 returns to step 806 at which it reads the next line in the temporary DSSF. Step 806 is described in greater detail above.

Figure 8A:
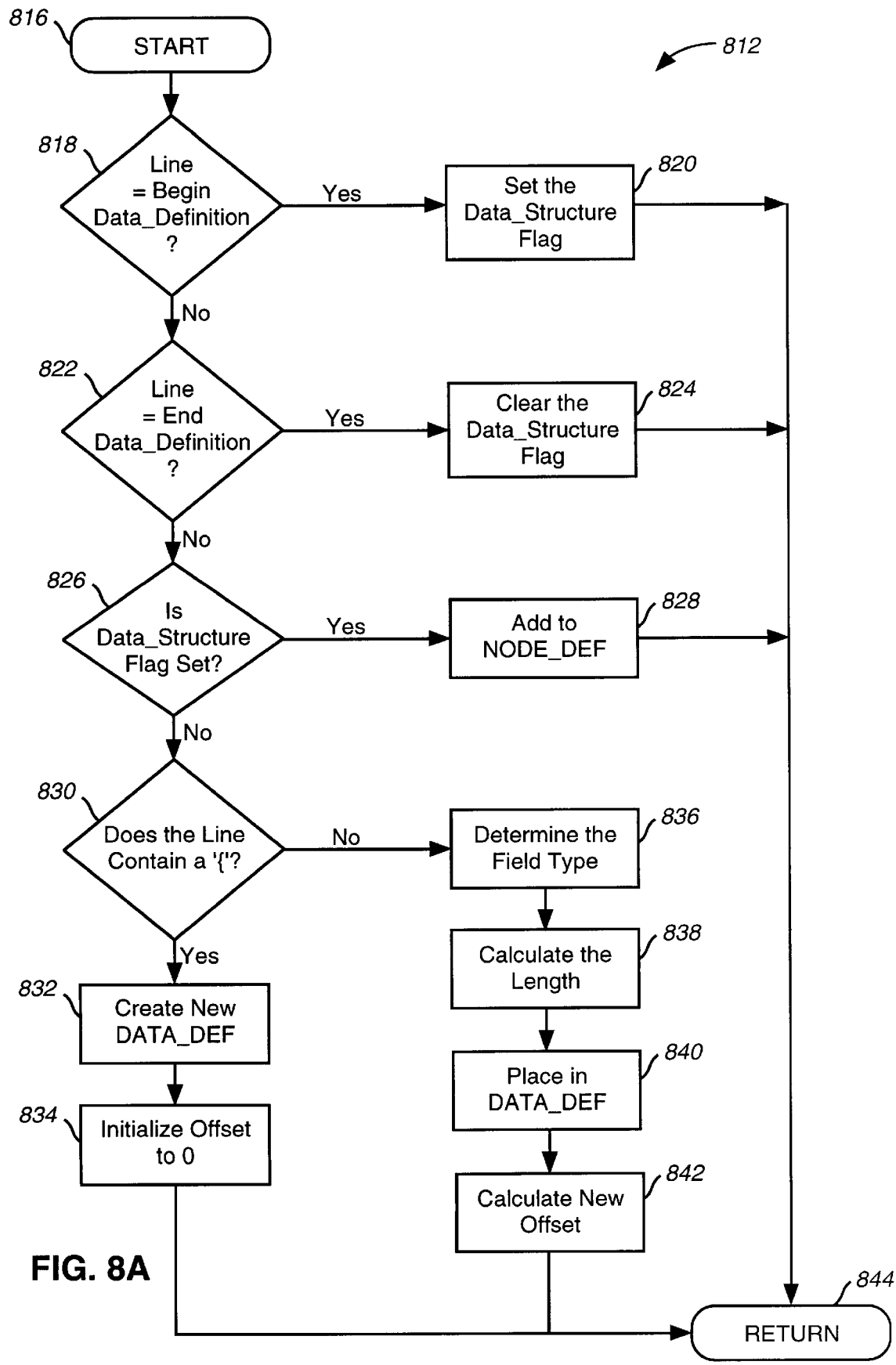
FIG. 8A is a control flow diagram illustrating the processing of a line in a DSSF file.

FIG. 8A is a control flow diagram illustrating step 812 and the processing of a line in the temporary rule file. Processing begins at step 816 and immediately proceeds to step 818. In step 818, the DDT 210 determines whether the line contains a "BEGIN DATA_DEFINITION" command. If the line does contain a "BEGIN DATA_DEFINITION" command, the DDT 210 proceeds to step 820. In step 820, the DDT 210 sets a Data_Structure flag to true. The DDT 210 then continues to step 844. In step 844, the DDT 210 has completed step 812 and its processing of the current line. Therefore, the DDT 210 returns control back to FIG. 8.

Referring again to step 818, if the DDT 210 determines that the line does not contain a "BEGIN DATA_DEFINITION" command, the DDT 210 proceeds to step 822. In step 822, the DDT 210 determines whether the line contains an "END DATA_DEFINITION" command. If the line does contain a "END DATA_DEFINITION" command, the DDT 210 proceeds to step 824. In step 824, the DDT 210 clears the Data_Structure flag by setting it to false. The DDT 210 then continues to step 844. In step 844, the DDT 210 has completed step 812 and its processing of the current line. Therefore, the DDT 210 returns control back to FIG. 8.

Referring again to step 822, if the DDT 210 determines that the line does not contain an "END DATA_DEFINITION" command, the DDT 210 proceeds to step 826. In step 826, the DDT 210 determines whether the Data_Structure flag is set to true. If the Data_Structure flag is set to true, the DDT 210 knows that it is processing a data definition and proceeds to step 828. In step 828, the DDT 210 adds the data structure defined in the current line to the NODE_DEF. The DDT 210 then continues to step 844. In step 844, the DDT 210 has completed step 812 and its processing of the current line. Therefore, the DDT 210 returns control back to FIG. 8.

Referring again to step 826, if the DDT 210 determines that the Data_Structure is not set to true, the DDT 210 proceeds to step 830. In step 830, the DDT 210 determines whether the current line contains a '{' symbol indicating that the line contains a name of a record structure. If the current line contains a '{' symbol, the DDT 210 proceeds to step 832.

In step 832, the DDT 210 creates a new DATA_DEF structure and enters the record name specified on the current line. Continuing to step 834, the DDT 210 initializes a variable Offset to 0, thereby preparing to read the first data field of the record structure. From step 834, the DDT 210 continues to step 844 at which it has completed step 812 and its processing of the current line. Therefore, the DDT 210 returns control back to FIG. 8.

Referring again to step 830, if the DDT 210 determines that the current line does not contain a '{' symbol, the DDT 210 proceeds to step 836. In step 836, the current line must contain a data field of a record structure. Therefore, DDT 210 determines the field type of the data field. More specifically, the DDT 210 determines whether the data field is an int, char, or other data type. Continuing to step 838, the DDT 210 calculates the length in bits and bytes of the current data field. Continuing to step 840, the DDT 210 enters the data field information into the DATA_DEF structure that it created in step 832. The data field information includes the data field name, type, length, and offset. Continuing to step 842, the DDT 210 calculates a new offset based on the previous offset and the size of the current data field. From step 842, the DDT 210 continues to step 844 at which it has completed step 812 and its processing of the current line. Therefore, the DDT 210 returns control back to FIG. 8.

Figure 9:
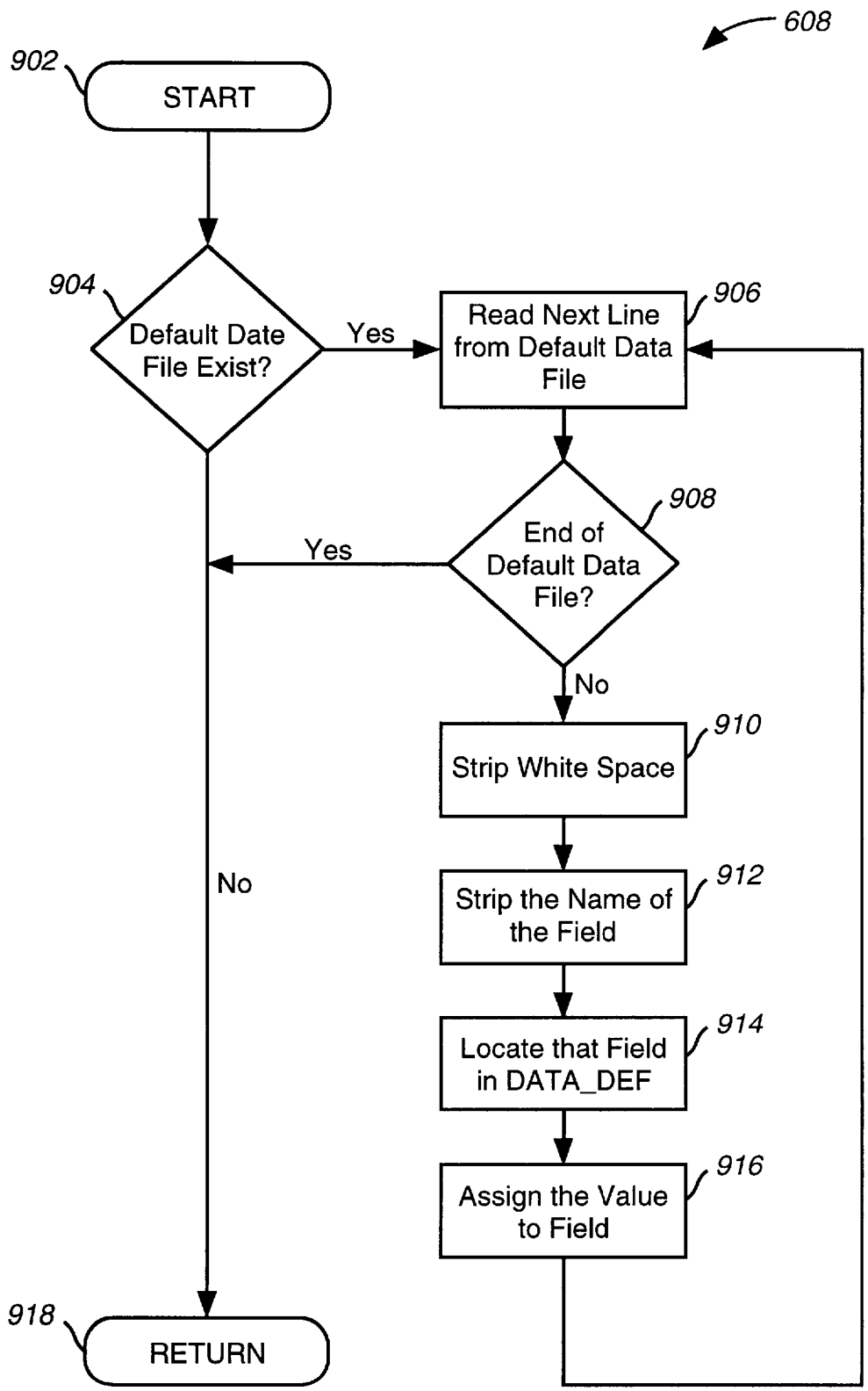
FIG. 9 is a control flow diagram illustrating the loading of default values into the data structures.

FIG. 9 is a control flow diagram illustrating step 608 and the loading of default values into the data structures that were created in step 606. Processing begins at step 902 and immediately continues to step 904. In step 904, the DDT 210 determines whether the default data file 204 exists because the default data file 204 is an optional input file to the DDT 210. If the default data file 204 does exist, the DDT 210 proceeds to step 906. In step 906, the DDT 210 reads the next line from the temporary default data file.

From step 906, the DDT 210 continues to step 908 and determines whether it has reached the end of the temporary default data file. If the DDT 210 has reached the end of the temporary default data file, the DDT 210 proceeds to step 918. In step 918, the DDT 210 has completed step 608 and its processing of the temporary default data file. Therefore, the DDT 210 returns control back to FIG. 6.

Referring again to step 908, if the DDT 210 determines that it has not reached the end of the temporary default data file, the DDT 210 proceeds to step 910. In step 910, the DDT 210 strips the white space from the current line. Continuing to step 912, the DDT 210 strips the name of a data field within a specific record structure that is to receive a default value. Continuing to step 914, the DDT 210 locates the specified data field of the specified record structure in the DATA_DEF structure. Continuing to step 916, the DDT 210 assigns the value specified in the default data file 204 to the located data field in the DATA_DEF structure. After assigning the default data value, the DDT 210 returns to step 906 to read the next line in the temporary default data file. Step 906 is described in greater detail above.

Referring again to step 904, if the DDT 210 determines that the default data file 204 does not exist, the DDT 210 proceeds to step 918. In step 918, the DDT 210 has completed step 608 and its processing of the temporary default data file. Therefore, the DDT 210 returns control back to FIG. 6.

Figure 10:
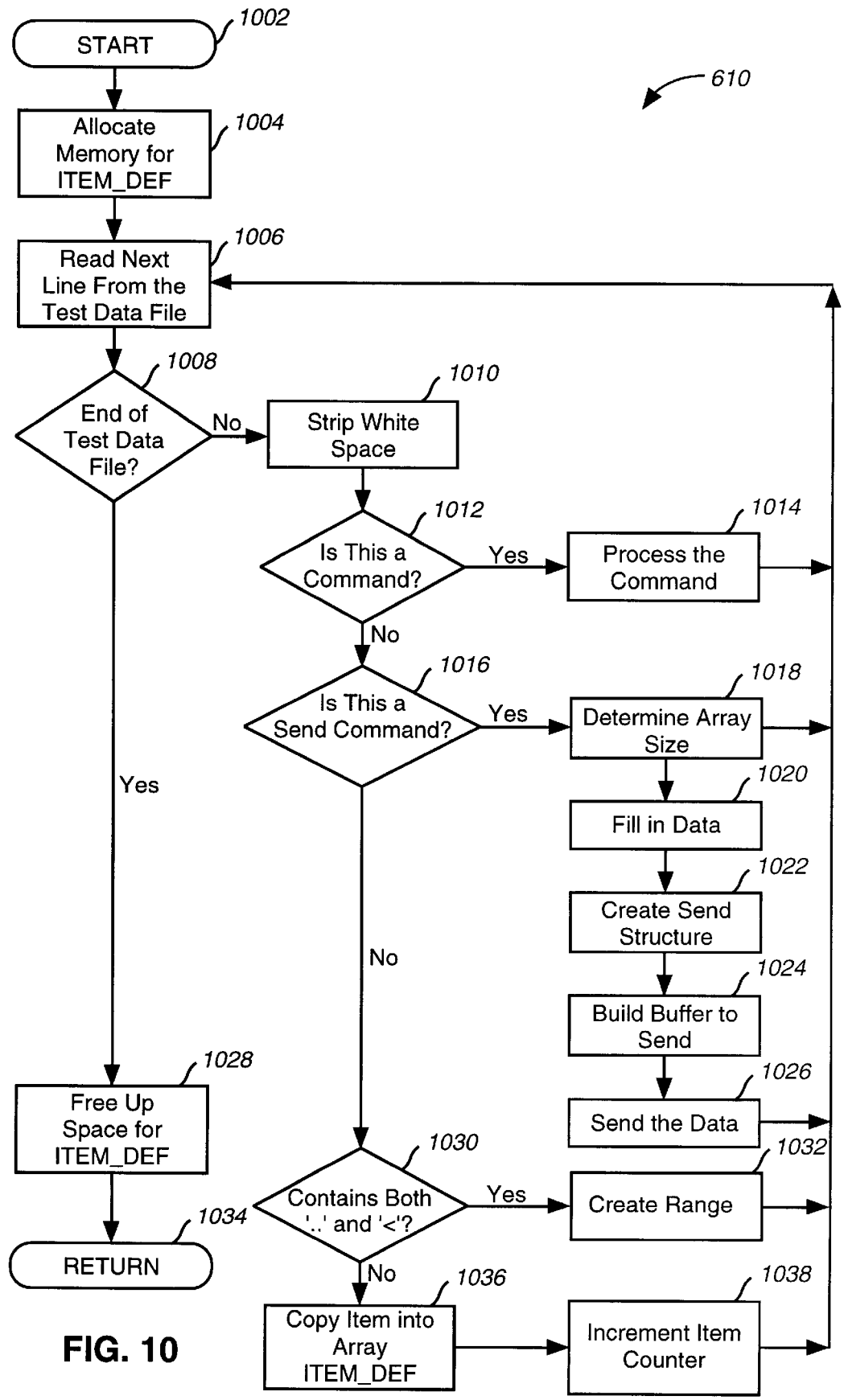
FIG. 10 is a control flow diagram illustrating the parsing of a test data file.

FIG. 10 is a control flow diagram illustrating step 610 and the parsing of a test data file 102a–102n stored in the temporary test data file. Processing begins at step 1002 and immediately proceeds to step 1004. In step 1004, the DDT 210 allocates memory 508 for the data structure ITEM_DEF. The preferred embodiment of the variable ITEM_DEF is an array containing each fully qualified item specified in the test data file 102a–102n that is to be transmitted to the record processing system 122. ITEM_DEF is used as a temporary version of NODE_DEF containing a list of items that are specified in the test data file 102a–102n and are to be sent to the record processing system 122 via the next send command. An example definition of ITEM_DEF is as follows:

```
typedef struct {
       char    item [100];
} ITEM_DEF;
```

It would be readily apparent to one skilled in the art to implement a comparable ITEM_DEF data structure.

Continuing to step 1006, the DDT 210 reads the next line from the temporary test data file. The DDT 210 then continues to step 1008. In step 1008, the DDT 210 determines whether it is at the end of the temporary test data file. If the DDT 210 is not at the end of the temporary test data file, the DDT 210 proceeds to step 1010.

In step 1010, the DDT 210 strips the white space from the current line that it just read in step 1006. Continuing to step 1012, the DDT 210 determines whether the current line contains a command, and more specifically, if the current line contains a non-send command. If the current line contains a non-send command, the DDT 210 proceeds to step 1014. In step 1014, the DDT 210 processes the command according to the preferred embodiment illustrated in Table 1. After the DDT 210 processes the command, the DDT 210 returns to step 1006 to read the next line in the temporary test data file. Step 1006 is described in greater detail above.

Referring again to step 1012, if the DDT 210 determines that the current line does not contain a command, the DDT 210 proceeds to step 1016. In step 1016, the DDT 210 determines whether the current line contains a send command. A send command instructs the DDT 210 to transmit the simulated records stored within a buffer to the record processing system 122. If the DDT 210 determines that the current line contains a send command, the DDT 210 proceeds to step 1018. In step 1018, the DDT 210 determines the number of array elements representing the amount of data in the buffer to be sent to the record processing system 122. Each array element is a separate data value.

Continuing to step 1020, the DDT 210 fills in the array with the data values for each of the items listed in ITEM_DEF. These data values comprise the simulated record(s) that the DDT 210 will send to the record processing system 122 via the next send command. Continuing to step 1022, the DDT 210 creates the simulated records that will be sent to the record processing system 122. The simulated records are built according to the data structures contained in the rules file 202 and loaded into the DATA_DEF structure. The DDT 210 then loads the data values from the array into the simulated records. If the array does not specify a data value for a specific data field, the DDT 210 loads the default data value associated with that data field.

Continuing to step 1024, the DDT 210 builds the buffer, a temporary workspace, by loading the record information contained in the NODE_DEF structure. This buffer information will be sent with the simulated records to the record processing system 122. Continuing to step 1026, the DDT 210 invokes the send command and transmits the simulated records from the buffer to the record processing system 122. After the DDT 210 transmits the simulated records, the DDT 210 returns to step 1006 to read the next line in the temporary test data file. Step 1006 is described in greater detail above.

Referring again to step 1016, if the DDT 210 determines that the current line does not contain a send command, the DDT 210 proceeds to step 1030. In step 1030, the DDT 210 determines whether the current line contains both the ".." and "<" symbols. The ".." and "<" symbols indicate that the test data file 102a–102n is assigning data values to a range of a data field in a simulated record. If the DDT 210 determines that the current line contains both the ".." and "<" symbols, the DDT 210 proceeds to step 1032. In step 1032, the DDT 210 calculates the specified range for the data field that is to receive the specified data values. The DDT 210 loops through the range and creates a new entry for ITEM_DEF identifying the range of specified data values that are to be transmitted to the record processing system 122. After processing the data range, the DDT 210 returns to step 1006 to read the next line in the temporary test data file. Step 1006 is described in greater detail above.

Referring again to step 1030, if the DDT 210 determines that the current line does not contain the ".." and "<" symbols, the DDT 210 proceeds to step 1036. In step 1036, the DDT 210 copies the data value specified in the current line to the ITEM_DEF structure. The DDT 210 then increments the counter of items in the ITEM_DEF structure. After processing the current item in the line, the DDT 210 returns to step 1006 to read the next line in the temporary test data file. Step 1006 is described in greater detail above. Referring again to step 1008, if the DDT 210 determines that it has reached the end of the test data file 102*a*–102*n*, the DDT 210 proceeds to step 1028. In step 1028, the DDT 210 frees up space in the ITEM_DEF structure. Continuing to step 1034, the DDT 210 has completed its processing of the temporary test data file. Therefore, the DDT 210 returns control back to FIG. 6.

Figure 11:
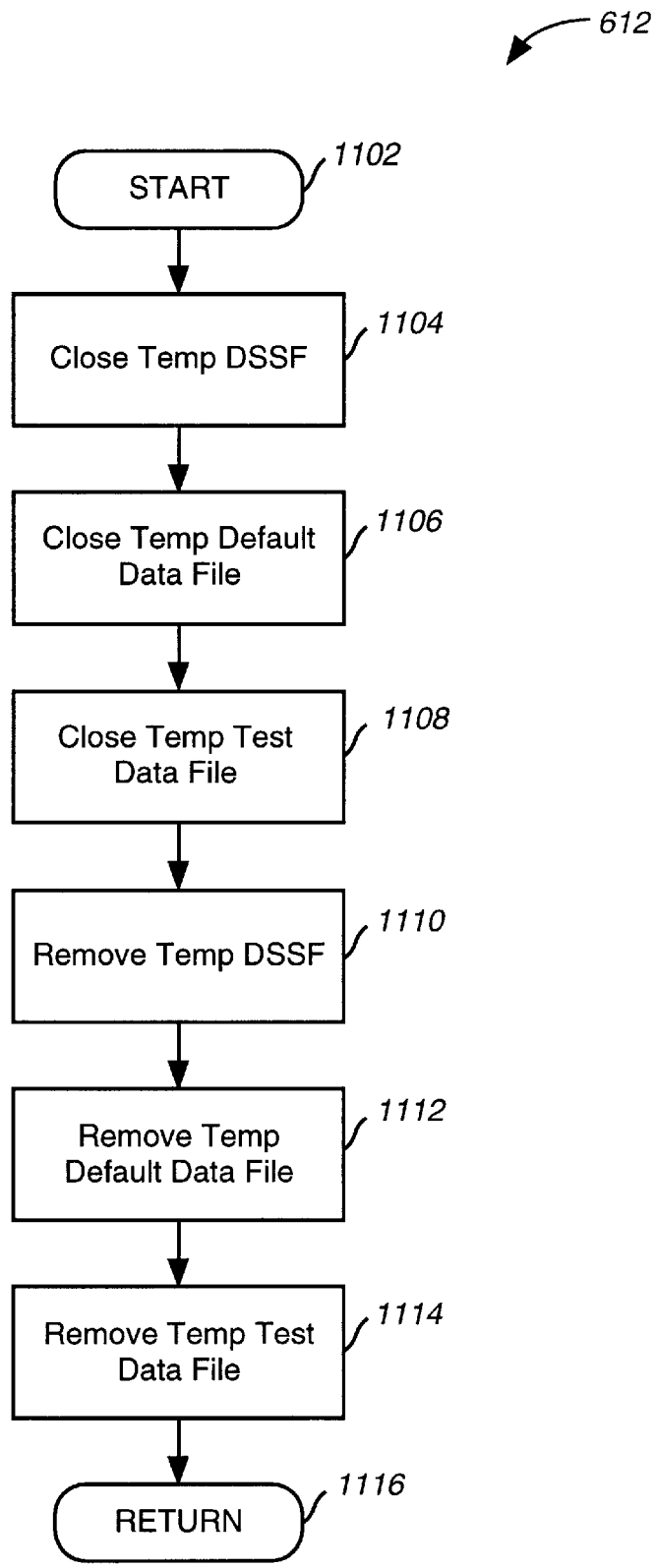
FIG. 11 is a control flow diagram illustrating the closing of the temp files.

FIG. 11 is a control flow diagram illustrating step 612 and the closing of the temporary files that were created in step 604. Processing begins at step 1102 and immediately proceeds to step 1104. In step 1104, the DDT 210 closes the temporary DSSF. Continuing to step 1106, the DDT 210 closes the temporary default data file. Continuing to step 1108, the DDT 210 closes the temporary test data file.

Continuing to step 1110, the DDT 210 removes, or deletes, the temporary DSSF. Continuing to step 1112, the DDT 210 removes, or deletes, the temporary default data file. Continuing to step 1114, the DDT 210 removes, or deletes, the temporary test data file. Continuing to step 1116, the DDT 210 completes its processing of step 612 and its closing of the temporary files. Therefore, the DDT 210 returns control back to FIG. 6.

TABLE 1

BEGIN DEFAULT_DATA

The preferred embodiment of the present invention supports the following is a list of commands:
BEGIN DEFAULT_DATA
BREAK
CALL
CONTINUE
END
END DEFAULT_DATA
ENDIF
ENDLOOP
GET_FIELD
GET_VAR
IF
LOOP
NEW_LINE
PAUSE
PRINT
PRINT_FIELD
PRINT_VAR
RANDOM
RECEIVE
RETURN
SEND
SEND_FILE
SIZEOF
USE
VAR
DEFINE
ENDIF
IFDEF
IFNDEF
INCLUDE
<label>
<#>
<#..#>
!        When placed at the beginning of a line, specifies a comment line.
\        Line continuation character.
+,–,*,/      Standard mathematical operators.
=,!=,<,>,<=,>=  Comparison operators.
Syntax:
    BEGIN DEFAULT_DATA
Description:
Signals the beginning of the default data for this file. Users may specify certain fields be defaulted throughout the Text Data file, or until overriding default data is provided. Spedifying defult data in the Test Data file takes precedence over defult data in the Default Data file.
Example:
Rule file:

TABLE 1-continued

BEGIN DATA_DEFINITION
TestDataStr< >
[
  TestHeader
  Data< >
  [
    TestData
  ]
]
END DATA_DEFINITION
TestHeader
[
  field_1, byte, 1
  field_2, int, 4
]
TestData
[
  field_3, char, 6
  field_4, long, 4
  field_5, bit, 3
  field_6, bit, 5
]
Script File:
  BEGIN DEFAULT_DATA
  TestHeader.field_1=2
  TestData.field_5=3
  END DEFAULT_DATA
Output:
  None
Related Commands:
  END DEFAULT_DATA

BREAK

Syntax:
  BREAK
Description:
Allows the user to break out a loop command early
Example:
Script file:
  VAR counter=1
  LOOP
    PRINT "Loop counter is?"
    PRINT_VAR counter
    NEW_LINE
    IF (counter) = (10)
      BREAK
    ENDIF
    VAR counter=counter+1
  ENDLOOP
Output:
  Loop counter is: 1
  Loop counter is: 2
  Loop counter is: 3
  Loop counter is: 4
  Loop counter is: 5
  Loop counter is: 6
  Loop counter is: 7
  Loop counter is: 8
  Loop counter is: 9
Related Commands:
  CONTINUE
  LOOP
  ENDLOOP

CALL

Syntax:
  CALL <label>
Description:
Allows the user define a subroutine and return from the subroutine.
<label> is the name of the label to branch to. See the <LABEL> command
for further information.
Example:
Rule file:
  BEGIN DATA_DEFINITION
  TestDataStr< >
  [

TABLE 1-continued

```
        TestHeader
        Data< >
        [
            TestData
        ]
    ]
    END DATA_DEFINITION
    TestHeader
    [
        field_1, byte, 1
        field_2, int, 4
    ]
Script file:
    LOOP 10
        CALL Build
        SEND
    ENDLOOP
    END
    Build:
    TestDataStr< >
    [
        TestHeader.field_1=sizeof(TestData)
        Data <1>
        [
            TestData.field_4=random(1..10)
        ]
    ]
    RETURN
Output:
    None
Related Commands:
    RETURN
    <LABEL>
```

CONTINUE

```
Syntax:
    CONTINUE
Description:
Allows the user to brach immediately to the ENDLOOP command.
Example:
Script file:
    VAR counter=1
    LOOP
        IF (counter) = (5)
            VAR counter=counter+1
            CONTINUE
        ENDIF
        PRINT "Loop counter is: "
        PRINT_VAR counter
        NEW_LINE
        IF (counter) = (10)
            BREAK
        VAR counter=counter+1
    ENDLOOP
Output:
    Loop counter is: 1
    Loop counter is: 2
    Loop counter is: 3
    Loop counter is: 4
    Loop counter is: 6
    Loop counter is: 7
    Loop counter is: 8
    Loop counter is: 9
Related Commands:
    BREAK
    LOOP
    ENDLOOP
```

END

```
Syntax:
    END
Description:
Allows the user to specify when to halt execution of the script file.
Example:
Rule file:
    BEGIN DATA_DESCRIPTION
    TestDataStr< >
    [
        TestHeader
        Data< >
        [
            TestData
        ]
    ]
    END DATA_DEFINITION
    TestHeader
    [
        field_1, byte, 1
        field_2, int, 4
    ]
    TestData
    [
    field_3, char, 6
        field_4, long, 4
        field_5, bit, 3
        field_6, bit, 5
    ]
Script file:
    LOOP 10
        CALL Build
        SEND
    ENDLOOP
    END
    Build:
    TestDataStr<1>
    [
        TestHeader.field_1=sizeof(TestData)
        Data <1>
        [
            TestData.field_4=random(1..10)
        ]
    ]
    RETURN
Output:
    None
Related Commands:
    None
```

END DEFAULT_DATA

```
Syntax:
    END DEFAULT_DATA
Description:
Signals the end of the default data for this file.
Example:
Rule file:
    BEGIN DATA_DEFINITION
    TestDataStr< >
    [
        TestHeader
        Data< >
        [
            TestData
        ]
    ]
    END DATA_DEFINITION
    TestHeader
    [
        field_1, byte, 1
        field_2, int, 4
    ]
    TestData
    [
        field_3, char, 6
        field_4, long, 4
        field_5, bit, 3
        field_6, bit, 5
    ]
Script file:
    BEGIN DEFAULT_DATA
    TestHeader.field_1=2
    TestData.field_5=3
    END DEFAULT_DATA
Output:
    None
Related Commands:
```

TABLE 1-continued

BEGIN DEFAULT_DATA

ENDIF

Syntax:
    ENDIF
Description:
Defines the end of an IF command structure.
Example:
Script file:
    VAR counter=1
    LOOP
        NEW_LINE
           *IF (counter) = (10)
              VAR counter=counter+1
              CONTINUE
           ENDIF
        PRINT "Loop counter is: "
        PRINT_VAR counter
        NEW_LINE
        IF (counter) = (10)
           BREAK
        ENDIF
        VAR counter=counter+1
    ENDLOOP
Output:
    Loop counter is: 1
    Loop counter is: 2
    Loop counter is: 3
    Loop counter is: 4
    Loop counter is: 6
    Loop counter is: 7
    Loop counter is: 8
    Loop counter is: 9
Related Commands:
    IF

ENDLOOP

Syntax:
    ENDLOOP
Description:
Defines the end of a LOOP command structure
Example:
Script file:
    VAR counter=1
    LOOP
        IF (counter) = (5)
           VAR counter=counter+1
           CONTINUE
        ENDIF
        PRINT "Loop counter is: "
        PRINT_VAR counter
        NEW_LINE
        IF (counter) = (10)
           BREAK
        ENDIF
        VAR counter=counter+1
    ENDLOOP
Output:
    Loop counter is: 1
    Loop counter is: 2
    Loop counter is: 3
    Loop counter is: 4
    Loop counter is: 6
    Loop counter is: 7
    Loop counter is: 8
    Loop counter is: 9
Related Commands:
    LOOP

GET_FIELD

Syntax:
    GET_FIELD <field name>
Description:
Allow the user, at routine, to enter an input into specified field.
<field name> specifies the field name to input into. Note: The field must be fully qualified.

Example:
Rule file:
    BEGIN DATA_DEFINITION
        TestDataStr< >
        [
            TestHeader
            Data< >
            [
                TestData
            ]
        ]
    END DATA_DEFINITION
    TestHeader
    [
        field_1, byte, 1
        field_2, int, 4
    ]
    TestData
    [
        field_3, char, 6
        field_4, long, 4
        field_5, bit, 3
    ]
Script file:
    LOOP 10
        CALL Build
        SEND
    ENDLOOP
    END
    Build:
    TestDataStr<1>
    [
        TestHeader.field_1=sizeof (TestData)
        Data <1>
        [
            TestData.field_4=random(1..10)
        ]
    ]
    GET_FIELD TestDataStr<1>Data<1>TestData.field_5
    RETURN
Output:
    None
Related Commands:
    GET_VAR

GET_VAR

Syntax:
    GET_VAR <variable name>
Description:
Allows the user, at random, to enter an input into a specified variable.
<variable same> specifies a variable that has been previously defined with a VAR command.
Example:
Rule file:
    BEGIN DATA_DEFINITION
        TestDataStr< >
        [
            TestHeader
            Data< >
            [
                TestData
            ]
        ]
    END DATA_DEFINITION
    TestHeader
    [
        field_1, byte, 1
    ]
    TestData
    [
        field_3, char, 6
        field_4, long, 4
    ]
Script file:
    VAR count=0
    GET_VAR count
    LOOP count
        CALL Build TABLE 1-continued

```
        SEND
    ENDLOOP
    END
    Build:
    TestDataStr<1>
    [
      Data <1>
      [
        TestData.field_4=random(1..10)
      ]
    ]
    RETURN
Output:
    None
Related Commands:
    GET FIELD
```

IF

```
Syntax:
    IF (<expression1>) <op> (<expression2>)
Description:
Executes the code in between the IF and ENDIF only if the condition
evaluation is TRUE.
<expression1> and <expression2> represent either a constant, variable, or
a field name. If it is a field, it must be a fully qualified name and it must
be in brackets.
<op> is either =,!,>,<,>=, or <=
Example:
Script file:
    VAR counter=1
    LOOP
      IF (counter) = (5)
        VAR counter=counter+1
        CONTINUE
      ENDIF
      PRINT "Loop counter is: "
      PRINT_VAR counter
      NEW_LINE
      IF (counter) = (10)
        BREAK
      VAR counter=counter+1
    ENDLOOP
Output:
    Loop counter is: 1
    Loop counter is: 2
    Loop counter is: 3
    Loop counter is: 4
    Loop counter is: 6
    Loop counter is: 7
    Loop counter is: 8
    Loop counter is: 9
Related Commands:
    ENDIF
```

LOOP

```
Syntax:
    LOOP <expression> or nothing
Description:
Executes the code in between the LOOP and the ENVELOPE a specified
number of times. If no parameter is specified, it will forever or until a
BREAK command is executed.
<expression> represent either a constant, variable, or a field name. If it is
a field, it must be fully qualified name and it must be in brackets.
Example:
Script file:
    VAR counter=1
    LOOP
      IF (counter) = (5)
        VAR counter=counter+1
        CONTINUE
      ENDIF
      PRINT "Loop counter is: "
      PRINT_VAR counter
      NEW_LINE
      IF (counter) = (10)
        BREAK
      VAR counter=counter+1
    ENDLOOP
Output:
    Loop counter is: 1
    Loop counter is: 2
    Loop counter is: 3
    Loop counter is: 4
    Loop counter is: 6
    Loop counter is: 7
    Loop counter is: 8
    Loop counter is: 9
Related Commands:
    ENDLOOP
```

NEW_LINE

```
Syntax:
    NEW_LINE
Description:
Moves the cursor to the next line.
Example:
Script file:
    VAR counter=1
    LOOP
      PRINT "Loop counter is: "
      PRINT_VAR counter
      NEW_LINE
      IF (counter) = (10)
        BREAK
      VAR counter=counter+1
    ENDLOOP
Output:
    Loop counter is: 1
    Loop counter is: 2
    Loop counter is: 3
    Loop counter is: 4
    Loop counter is: 5
    Loop counter is: 6
    Loop counter is: 7
    Loop counter is: 8
    Loop counter is: 9
Related Commands:
    PRINT
```

PAUSE

```
Syntax:
    PAUSE <string> or <expression>
Description:
The execution of a script is paused for a number of seconds or until a
keypass.
<string> specifies the string to print on the screen. Execution will halt
until enter is pressed.
<expression> represent either a constant, variable, or a field name of the
number of seconds to pause. If it is a field, it must be a fully qualified
name and it must be in brackets.
Example:
Rule file:
    BEGIN DATA_DEFINITION
    TestDataStr< >
    [
      TestHeader
      Data< >
      [
        TestData
      ]
    ]
    END DATA_DEFINITION
    TestHeader
    [
      field_1, byte, 1
    ]
    TestData
    [
      field_3, char, 6
      field_4, long, 4
    ]
Script file:
    VAR count=10
    LOOP count
```

TABLE 1-continued

```
        TestDataStr<1>
        [
            TestHeader.field_1=sizeof (TestData)
            Data <1>
            [
                TestData.field_4=random(1..10)
            ]
        ]
        SEND
        PAUSE 5
    ENDLOOP
Output:
    None
Related Commands:
    None
```

PRINT

Syntax:
    PRINT <string>
Description:
Print the message that follows in quotes to the screen.
<string> a quoted string that is to be printed
Example:
Script file:
```
    VAR counter=1
    LOOP
        PRINT "Loop counter is: "
        PRINT_VAR counter
        NEW_LINE
        IF (counter) = (10)
            BREAK
        ENDIF
        VAR counter=counter+1
    ENDLOOP
Output:
    Loop counter is: 1
    Loop counter is: 2
    Loop counter is: 3
    Loop counter is: 4
    Loop counter is: 5
    Loop counter is: 6
    Loop counter is: 7
    Loop counter is: 8
    Loop counter is: 9
Related Commands:
    PRINT_FIELD
    PRINT_VAR
```

PRINT_FIELD

Syntax:
    PRINT_FIELD <field name>
Description:
Prints the current value of fieldname to the screen.
<field name> specifies the field name to print to the screen. Note: The field name must be fully qualified.
Example:
Rule file:
```
    BEGIN DATA_DEFINITION
    TestDataStr< >
    [
        TestHeader
        Data< >
        [
            TestData
        ]
    ]
    END DATA_DEFINITION
    TestHeader
    [
        field_1, byte, 1
        field_2, int, 4
    ]
    TestData
    [
        field_3, char, 6
        field_4, long, 4
    ]
```

Script file:
```
    LOOP 4
        TestDataStr<1>
        [
            TestHeader.field_1=sizeof (TestData)
            Data <1>
            [
                TestData.field_4=random (1..10)
            ]
        ]
        PRINT
        NEW_LINE
    ENDLOOP
Output:
    random (1..10)
    random (2..10)
    random (3..10)
    random (4..10)
Related Commands:
    PRINT
    PRINT_VAR
```

PRINT_VAR

Syntax:
    PRINT_VAR <expression>
Description:
Prints the value of the variable specified.
<expression> represent either a constant, variable, or a field name. If it is a field, it must be a fully qualified name and it must be in brackets.
Example:
Script file:
```
    VAR counter=1
    LOOP
        IF (counter) = (5)
            VAR counter=counter+1
            CONTINUE
        ENDIF
        PRINT "Loop counter is: "
        PRINT_VAR counter
        NEW_LINE
        IF (counter) = (10)
            BREAK
        VAR counter=counter+1
    ENDLOOP
Output:
    Loop counter is: 1
    Loop counter is: 2
    Loop counter is: 3
    Loop counter is: 4
    Loop counter is: 6
    Loop counter is: 7
    Loop counter is: 8
    Loop counter is: 9
Related Commands:
    PRINT
    PRINT_VAR
```

RANDOM

Syntax:
    RANDOM [<expression1>..<expression2>)
Description:
Requests that a random number between the given values be returned.
<expression1> and <expression2> represent either a constant, or variable.
Example:
Rule file:
```
    BEGIN DATA_DEFINTION
    TestDataStr< >
    [
        TestHeader
        Data< >
        [
            TestData
        ]
    ]
    END DATA_DEFINITION
    TestHeader
    [
```

TABLE 1-continued

```
        field_1, byte, 1
        field_2, int, 4
    ]
    TestData
    [
        field_3, char, 6
        field_4, long, 4
        field_5, bit, 3
        field_6, bit, 5
    ]
Script file:
    LOOP 5
        TestDataStr<1>
        [
            TestHeader.field_1=sizeof (TestData)
            Data<1>
            [
                TestData.field_4=random (1..10)
            ]
        ]
        PRINT_FIELD TestDataStr<1>Data<1>TestData.field_4
        NEW_LINE
        SEND
    ENDLOOP
Output:
    random (1..10)
    random (2..10)
    random (3..10)
    random (4..10)
Related Commands:
    None
```

RECEIVE

```
Syntax:
    RECEIVE <filename>
Description:
Signals the tool to receive data. If no filename is pefified, <Test Data
filename>.recv is used.
<filename> (optional) specifies the file name that the data read is stored.
Example:
Rule file:
    BEGIN DATA_DEFINITION
    TestDataStr< >
    [
        TestHeader
        Data< >
        [
            TestData
        ]
    ]
    Register< >
    [
        Registration
    ]
    END DATA_DEFINITION
    TestHeader
    [
        field_1, byte, 1
        field_4, int, 4
    ]
    TestData
    [
        field_3, char, 6
        field_4, long, 4
    ]
    Registration
    [
        field_7, int, 4
    ]
Script File:
    RECEIVE reg.msg
    USE Register
    Register <1>
    [
        Registration.field_7=4
    ]
    SEND reg.1
    USE TestDataStr
```

```
Output:
    None
Related Commands:
    SEND
```

RETURN

```
Syntax:
    RETURN
Description:
Returns to the point a subroutine was called.
Example:
Rule file:
    BEGIN DATA_DEFINITION
    TestDataStr< >
    [
        TestHeader
        Data< >
        [
            TestData
        ]
    ]
    END DATA_DEFINITION
    TestHeader
    [
        field_1, byte, 1
        field_2, int, 4
    ]
    TestData
    [
        field_3, char, 6
        field_4, long, 4
    ]
Script file:
    LOOP 3
        CALL Build
        SEND
        PAUSE 5
    ENDLOOP
    END
    Build:
    TestDataStr<1>
    [
        TestHeader.field_1=sizeof (TestData)
        Data <1>
        [
            TestData.field_4=random (1..10)
        ]
    ]
    PRINT_FIELD TestDataStr<1>Data<1>.TestData.field_4
    NEW_LINE
    RETURN
Output:
    random (1..10)
    random (1..10)
    random (1..10)
Related Commands:
    CALL
```

SEND

```
Syntax:
    SEND <filename>
Description:
[Signals the tool to send the data created so far. If not filename is
specified, <Test Data filename>.gen is used.
<filename> (optional) specifies the file name that the data sent is stored.
Example:
Rule file:
    BEGIN DATA_DEFINITION
    TestDataStr< >
    [
        TestHeader
        Data< >
        [
            TestData
        ]
    ]
    END DATA_DEFINITION
```

TABLE 1-continued

```
    TestHeader
    [
        field_1, byte, 1
    ]
    TestData
    [
        field_3, char, 6
        field_4, long, 4
    ]
Script file:
    LOOP 5
        CALL Build
        SEND
    ENDLOOP
    END
    Build:
    TestDataStr<1>
    [
        TestHeader.field_1=sizeof (TestData)
        Data<1>
        [
            TestData.field_4=random (1..10)
        ]
    ]
    RETURN
Output:
    None
Related Commands:
    RECEIVE
```

SEND_FILE

Syntax:
    SEND <filename>
Description:
Sends a file over the communications protocol.
<filename> specifies the binary file to be sent.
Example:
Script file:
```
    LOOP 5
        SEND_FILE test.bin
    ENDLOOP
```
Output:
    None
Related Commands:
    SEND

SIZEOF

Syntax:
    SIZEOF (<structure>)
Description:
Similar to the C sizeof command. The tool converts whatever structure that follows in parentheses into an integer value. This is useful for setting header fields which specify the message size.
Example:
Rule file:
```
    BEGIN DATA_DEFINITION
    TestDataStr< >
    [
        TestHeader
        Data< >
        [
            TestData
        ]
    ]
    END DATA_DEFINITION
    TestHeader
    [
        field_1, byte, 1
        field_2, int, 4
    ]
    TestData
    [
        field_3, char, 6
        field_4, long, 4
    ]
Script file:
    LOOP 5
        CALL Build
        SEND
    ENDLOOP
    END
    Build:
    TestDataStr<1>
    [
        TestHeader.field_1=sizeof (TestData)
        Data <1>
        [
            TestData.field_4=random (1..10)
        ]
    ]
    RETURN
```
Output:
    None
Related Commands:
    None

USE

Syntax:
    USE <data definition>
Description:
The current structure gets flushed into a buffer. The data that follows is put into the specified data structure and appended to the buffer. This is useful for sending multiple data types through a single feed (i.e., OSRs and CDRs in one message).
<data definition> specifies the name of the data that is to be used.
Example:
Rule file:
```
    BEGIN DATA_DEFINITION
    TestDataStr< >
    [
        TestHeader
        Data< >
        [
            TestData
        ]
    ]
    Register< >
    [
        Registration
    ]
    END DATA_DEFINITION
    TestHeader
    [
        field_1, byte, 1
    ]
    TestData
    [
        field_3, char, 6
        field_4, long, 4
    ]
    Registration
    [
        field_7, int, 4
    ]
Script file:
    USE Register
    Register<1>
    [
        Registration.field_7=4
    ]
    SEND reg.1
    USE TestDataStr
```
Output:
    None
Related Commands:
    None

VAR

Syntax:
    VAR <variable name>=<expresison>
Description:
This expression on a single line allows the user to set a specific variable name to equal a number or an expression. This variable may be used throughout the Test Data file.

TABLE 1-continued

```
<variable name> specifies the name of the variable to be created.
<expression> represents either a constant, variable, or a field name. If it is
a field, it must be a fully qualified name and it must be in brackets.
Example:
Script file:
    VAR count=0
    GET_VAR count
    LOOP count
        CALL Build
        SEND
        PAUSE 5
    ENDLOOP
    END
    Build:
    TestDataStr<1>
    [
        TestHeader.field_1=sizeof (TestData)
        Data<1>
        [
            TestData.field_4=random(1..10)
        ]
    ]
    RETURN
Output:
    None
Related Commands:
    GET_VAR
    PRINT_VAR
```

DEFINE

```
Syntax:
    #DEFINE <symbol name>=<constant>
Description:
Defines a constant global variable.
<symbol name> specifies the name of the symbol to be created.
<constant> specifies the value of the <symbol name>
Example:
Test Rule file:
    TestDataStr< >
    [
        TestHeader
        Data< >
        [
            TestData
        ]
    ]
    END DATA_DEFINITION
    TestHeader
    [
        field_1, byte, 1
    ]
    TestData
    [
        field_3, char, 6
        field_4, long, 4
    ]
    #INCLUDE "Register.rule"
Register.rule:
    #IFNDEF REGISTER_FILE
    #DEFINE REGISTER_RULE=0
    BEGIN DATA_DEFINITION
    Register< >
    [
        Registration
    ]
    END DATA_DEFINITION
    Registration
    [
        field_7, int, 4
    ]
    #ENDDIF
Output:
    None
Related Commands:
    None
```

TABLE 1-continued

```
#ENDIF

Syntax:
    #ENDIF
Description:
Defines the end of an #IFDEF of #IFNDEF command structure.
Example:
Rule file:
    #IFNDEF REGISTER_RULE
    #DEFINE REGISTESR_RULE=0
    BEGIN DATA_DEFINITION
    Register < >
    [
        Registration
    ]
    END DATA_DEFINITION
    Registration
    [
        field_7, int, 4
    ]
    #ENDIF
Output:
    None
Related Commands:
    #IFDEF
    #IFNDEF
```

IFDEF

```
Syntax:
    #IFDEF <symbol name>
Description:
Includes the code in between the #IFDEF and the #ENDIF ony if the
name exists as either a environment variable or a global variable.
<symbol name> specifies the symbol name to check the existence of.
Example:
Test Rule file:
    BEGIN DATA_DEFINITION
    TestDataStr< >
    [
        Testheader
        Data< >
        [
            TestData
        ]
    ]
    END DATA_DEFINITION
    TestHeader
    [
        field_1, byte, 1
        field_2, int, 4
    ]
    TestData
    [
        field_3, char, 6
        field_4, long, 4
    ]
    #DEFINE REGISTER_RULE
    #INCLUDE "Register.rule"
Register.rule:
    #IFDEF REGISTER_RULE
    BEGIN DATA_DEFINITION
    Register< >
    [
        Registration
    ]
    END DATA_DEFINITION
    Registration
    [
        field_7, int, 4
    ]
    #ENDIF
Output:
    None
Related Commands:
    #IFNDEF
```

TABLE 1-continued

IFNDEF

Syntax:
    #IFNDEF <symbol name>
Description:
Includes the code in between the #IFNDEF and the #ENDIF only if the name doesn't exist as either an environment variable or a global variable. <symbol name> specifies the symbol name to check the existence of.
Example:
Test Rule file:
    BEGIN DATA_DEFINITION
    TestDataStr< >
    [
      TestHeader
      Data< >
      [
        TestData
      ]
    ]
    END DATA_DEFINITION
    TestHeader
    [
      field_1, byte, 1
      field_2, int, 4
    ]
    TestData
    ]
      field_3, char, 6
      field_4, long, 4
    ]
    #INCLUDE "Register.rule"
Register.rule:
    #IFNDEF REGISTER_RULE
    #DEFINE REGISTER_RULE
    BEGIN DATA_DEFINITION
    Register< >
    [
      Registration
    ]
    END DATA_DEFINITION
    Registration
    [
      field_7, int, 4
    ]
    #ENDIF
Output:
    None
Related Commands:
    #IFDEF

INCLUDE

Syntax:
    #INCLUDE <filename>
Description:
Includes the file specified into the current file.
<filename> specifies the file name to include into the current file.
Example:
Test Rule file:
    BEGIN DATA_DEFINITION
    TestDataStr< >
    [
      TestHeader
      Data< >
      [
        TestData
      ]
    ]
    END DATA_DEFINITION
    TestHeader
    [
      field_1, byte, 1
      field_2, int, 4
    ]
    TestData
    [
      field_3, char, 6
      field_4, long, 4
      field_5, bit, 3
      field_6, bit, 5
    ]
    #INCLUDE "Register.rule"
Register.rule:
    #IFNDEF REGISTER_RULE
    #DEFINE REGISTER_RULE
    BEGIN DATA_DEFINITION
    Register< >
    [
      Registration
    ]
    END DATA DEFINITION
    Registration
    [
      field_7, int, 4
    ]
    #ENDIF
Output:
    None
Related Commands:
    None

<LABEL>

Syntax:
    <LABEL>
Description:
Identifies a subroutine.
Example:
Rule file:
    BEGIN DATA_DEFINITION
    TestDataStr< >
    [
      TestHeader
      Data< >
      [
        TestData
      ]
    ]
    END DATA_DEFINITION
    TestHeader
    [
      field_1, byte, 1
      field_2, int, 4
    ]
    TestData
    [
      field_3, char, 6
      field_4, long, 4
      field_5, bit, 3
      field_6, bit, 5
    ]
Script file:
    VAR count=5
    LOOP count
      CALL Build
      SEND
      PAUSE 5
    ENDLOOP
    END
    Build:
    TestDataStr<1>
    [
      TestHeader.field_1=sizeof (TestData)
      Data<1>
      [
        TestData.field_4=random (1..10)
      ]
    ]
    RETURN
Output:
    None
Related Commands:
    CALL <#> or <#,#>

Syntax:
    <datadefinition><<expression1>> or

TABLE 1-continued

```
<datadefinition><<expression>..<expression2>>
Description:
<definition> specifies the name of the data that is to be used.
<expression1> and <expression2> represent either a constant, or
variable.
Example:
Rule file:
    BEGIN DATA_DEFINITION
    TestDataStr< >
    [
        TestHeader
        Data< >
        [
            TestData
        ]
    ]
    END DATA_DEFINITION
    TestHeader
    [
        field_1, byte, 1
        field_2, int, 4
    ]
    TestData
    [
        field_3, char, 6
        field_4, long, 4
        field_5, bit, 3
        field_6, bit, 5
    ]
Script file:
    LOOP 5
        CALL Build
        SEND
        PAUSE 5
    ENDLOOP
    END
    Build:
    TestDataStr<1>
    [
        TestHeader.field_1=sizeof (TestData)
        Data <1..3>
        [
            TestData.field_4=random(1..10)
        ]
    ]
    RETURN
Output:
    None.
Related Commands:
    None.
```

CONCLUSION

While various embodiments of the present invention have been described above, it should be understood that they have been presented by the way of example only, and not limitation. It should be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A dynamic data tool for dynamically generating simulated records comprising:

an executable program means for generating and transmitting simulated records;

a data structure definition means for defining record structures having data fields and for inputting said record structures into said executable program means, said data structure definition means further including a means for altering said record structures at run-time;

a test data means for inputting to said executable program means one or more actual values, each of said actual values corresponding to a data field in a simulated record, wherein said executable program means assigns each of said actual values to said data field of said simulated record prior to transmitting said simulated record, said test data means further including a means for altering said actual values at run-time; and means for inputting to said executable program means one or more calling patterns, each of said calling patterns representing a number and frequency with which said executable program means transmits said simulated records, said test data means further including a means to alter said calling pattern at run-time.

2. The dynamic data tool according to claim 1, said executable program means comprising:

a build data structure means for retrieving said record structures from said data structure definition means, and building one or more of said simulated records;

a value parsing means for parsing and processing said actual values, wherein said value parsing means assigns said actual values to said data fields of said simulated records prior to transmitting said simulated records; and a calling pattern parsing means for parsing and processing said calling patterns.

3. The dynamic data tool according to claim 2, said calling pattern parsing means comprising:

a line reading means for reading a line of a calling pattern;

a command determining means for determining whether said line of said calling pattern contains a non-send command;

a command processing means for processing said non-send command if said command determining means determines that said line of said calling pattern contains a non-send command;

a send command determining means for determining whether said line of said calling pattern contains a send command; and a send command processing means for processing said send command if said send command determining means determines that said line of said calling pattern contains a send command.

4. A dynamic data tool for dynamically generating simulated records comprising:

an executable program means for generating and transmitting simulated records;

a data structure definition means for defining record structures having data fields and for inputting said record structures into said executable program means, said data structure definition means further including a means for altering said record structures at run-time;

a test data means for inputting to said executable program means one or more actual values, each of said actual values corresponding to a data field in a simulated record, wherein said executable program means assigns each of said actual values to said data field of said simulated record prior to transmitting said simulated record, said test data means further including a means for altering said actual values at run-time;

a default data means for inputting to said executable program means one or more default values, each default value corresponding to a data field of a simulated record; and wherein said executable program means comprises:

a build data structure means for retrieving said record structures from said data structure definition means and building one or more of said simulated records;

a default loading means for retrieving said default values from said default data means and loading said default values into said simulated records;

a value parsing means for parsing and processing said actual values, wherein said value parsing means assigns said actual values to said data fields of said simulated records prior to transmitting said simulated records; and a calling pattern parsing means for parsing and processing said calling patterns.

5. The dynamic data tool according to claim 4, said calling pattern parsing means comprising:

a line reading means for reading a line of a calling pattern;

a command determining means for determining whether said line of said calling pattern contains a non-send command;

a command processing means for processing said non-send command if said command determining means determines that said line of said calling pattern contains a non-send command;

a send command determining means for determining whether said line of said calling pattern contains a send command; and a send command processing means for processing said send command if said send command determining means determines that said line of said calling pattern contains a send command.

6. A method for dynamically generating simulated records, comprising the steps of:

(1) inputting one or more record structures from a text file, each of said record structures defining a simulated record and having one or more data fields;

(2) building one or more of said simulated records from said record structures;

(3) inputting one or more actual values from a text file, each of said actual values corresponding to a data field in said simulated record;

(4) assigning said actual values to said data fields of said simulated records.

(5) inputting one or more calling patterns from a text file, each of said calling patterns representing a number and frequency with which said simulated records are to be transmitted;

(6) inputting one or more default values each of said default values corresponding to a data field of said simulated records; and (7) assigning said default values to said data fields of said simulated records.

7. The method of claim 6, wherein said actual values and said calling patterns are stored in a test data file.

8. The method of claim 6, wherein said default values are stored in a default data file.

9. The method of claim 6, further comprising the steps of:

(8) reading a line of a calling pattern;

(9) determining whether said line of said calling pattern contains a non-send command;

(10) processing said non-send command if it is determined in step (9) that said line of said calling pattern contains a non-send command;

(11) determining whether said line of said calling pattern contains a send command; and

(12) processing said send command if it is determined in step (11) that said line of said calling pattern contains a send command.

10. A computer program product for use with a computer system, comprising: a computer usable medium having computer readable program code means embodied in said medium for enabling a computer to dynamically generate and transmit simulated records, said computer readable program code means comprising:

first computer readable program code means for enabling the computer to generate one or more simulated records;

second computer readable program code means for enabling the computer to input to said first computer readable program code means a text file comprising a definition for one or more record structures, each record structure defining a simulated record and having one or more data fields;

third computer readable program code means for enabling the computer to input to said first computer readable program code means a text file comprising one or more actual values, each actual value corresponding to a data field in a simulated record, wherein said first computer readable program code means enables the computer to assign said actual value to said data field of said simulated record prior to transmitting said simulated record;

fourth computer readable program code means for enabling the computer to input to said first computer readable program code means one or more default values, each of said default values corresponding to a data field of a simulated record, and wherein said first computer readable program code means comprises:

a build data structure means for enabling the computer to retrieve said record structures from said second computer readable program means and build one or more of said simulated records, a default loading means for enabling the computer to retrieve said default values from said fourth computer readable program code means and load said default values into said simulated records, a value parsing means for enabling the computer to parse and process said actual values, wherein said value parsing means enables the computer to assign said actual values to said data fields of said simulated records prior to transmitting said simulated records, and a calling pattern parsing means for enabling the computer to parse and process said calling patterns.

11. The computer program product according to claim 10, said calling pattern parsing means comprising:

a line reading means for enabling the computer to read a line of a calling pattern;

a command determining means for enabling the computer to determine whether said line of said calling pattern contains a non-send command;

a command processing means for enabling the computer to process said non-send command if said command determining means determines that said line of said calling pattern contains a non-send command;

a send command determining means for enabling the computer to determine whether said line of said calling pattern contains a send command; and a send command processing means for enabling the computer to process said send command if said send command determining means determines that said line of said calling pattern contains a send command.

12. A computer program product for use with a computer system, comprising: a computer usable medium having computer readable program code means embodied in said medium for enabling a computer to dynamically generate and transmit simulated records, said computer readable program code means comprising:

first computer readable program code means for enabling the computer to generate one or more simulated records;

second computer readable program code means for enabling the computer to input to said first computer readable program code means a text file comprising a definition for one or more record structures, each record structure defining a simulated record and having one or more data fields;

third computer readable program code means for enabling the computer to input to said first computer readable program code means a text file comprising one or more actual values, each actual value corresponding to a data field in a simulated record, wherein said first computer readable program code means enables the computer to assign said actual value to said data field of said simulated record prior to transmitting said simulated record; and wherein said third computer readable program means further comprises:
means for enabling the computer to input to said first computer readable program code means one or more calling patterns, each of said calling patterns representing a number and frequency with which said first computer readable program code means causes the computer to transmit said simulated records.

13. The computer program product according to claim 12, wherein said first computer readable program code means further comprises:

a build data structure means for enabling the computer to retrieve said record structures from said second computer readable program means and build one or more of said simulated records;

a value parsing means for enabling the computer to parse and process said actual values, wherein said value parsing means enables the computer to assign said actual values to said data fields of said simulated records prior to transmitting said simulated records; and a calling pattern parsing means for enabling the computer to parse and process said calling patterns.

14. The computer program product according to claim 13, said calling pattern parsing means comprising:

a line reading means for enabling the computer to read a line of a calling pattern;

a command determining means for enabling the computer to determine whether said line of said calling pattern contains a non-send command;

a command processing means for enabling the computer to process said non-send command if said command determining means determines that said line of said calling pattern contains a non-send command;

a send command determining means for enabling the computer to determine whether said line of said calling pattern contains a send command; and a send command processing means for enabling the computer to process said send command if said send command determining means determines that said line of said calling pattern contains a send command.

15. A dynamic data tool for dynamically generating simulated records comprising:

an executable program means for generating and transmitting simulated records;

a data structure definition means for defining record structures having data fields and for inputting said record structures into said executable program means, said data structure definition means further including a means for altering said record structures at run-time;

a test data means for inputting to said executable program means one or more actual values, each of said actual values corresponding to a data field in a simulated record, wherein said executable program means assigns each of said actual values to said data field of said simulated record prior to transmitting said simulated record, said test data means further including a means for altering said actual values at run-time; and calling pattern means for inputting to said executable program means one or more calling patterns, each of said calling patterns representing a number and frequency with which said executable program means transmits said simulated records.

* * * * *